(12) United States Patent
Yazdani et al.

(10) Patent No.: US 12,320,676 B2
(45) Date of Patent: Jun. 3, 2025

(54) DUAL ROTARY VARIABLE DIFFERENTIAL TRANSDUCER

(71) Applicant: Sensata Technologies, Inc., Attleboro, MA (US)

(72) Inventors: Saeed Yazdani, Moorpark, CA (US); Prem Trivedi, Moorpark, CA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 647 days.

(21) Appl. No.: 17/578,776

(22) Filed: Jan. 19, 2022

(65) Prior Publication Data

US 2022/0244077 A1 Aug. 4, 2022

Related U.S. Application Data

(60) Provisional application No. 63/143,063, filed on Jan. 29, 2021.

(51) Int. Cl.
*G01D 5/12* (2006.01)
*H01F 21/06* (2006.01)
*H01F 27/02* (2006.01)

(52) U.S. Cl.
CPC ............. *G01D 5/12* (2013.01); *H01F 21/06* (2013.01); *H01F 27/02* (2013.01)

(58) Field of Classification Search
CPC ........................................................ G01D 5/12
USPC ............................................................ 33/1 PT
See application file for complete search history.

(56) References Cited

U.S. PATENT DOCUMENTS

| | | | | |
|---|---|---|---|---|
| 3,755,699 A * | 8/1973 | Cartwright | ............. | H01F 7/066 310/12.24 |
| 4,237,742 A * | 12/1980 | Barthruff | ............... | B60K 31/02 180/178 |
| 4,257,508 A * | 3/1981 | Bennett | ................... | F16D 27/06 192/84.951 |
| 4,269,027 A * | 5/1981 | Mattson | .................... | F02C 6/20 477/181 |
| 4,275,558 A * | 6/1981 | Hatch | ....................... | F02C 6/20 60/791 |
| 4,325,337 A * | 4/1982 | Eheim | ....................... | F02D 1/08 123/357 |
| 5,816,102 A * | 10/1998 | Kern | ...................... | H02K 7/116 464/76 |
| 7,669,275 B2 * | 3/2010 | Yagi | ......................... | B60S 1/26 15/250.31 |

(Continued)

FOREIGN PATENT DOCUMENTS

CN 111140641 A 5/2020

OTHER PUBLICATIONS

Office Action issued in related Application Serial No 22154115.4 on Apr. 29, 2024.

(Continued)

*Primary Examiner* — George B Bennett
(74) *Attorney, Agent, or Firm* — Mark H. Whittenberger; Holland & Knight LLP

(57) ABSTRACT

Embodiments of the present disclosure are directed towards rotary variable differential transducers. The transducer may include a housing and an armature shaft included within the housing. The transducer may further include an input shaft configured to mate with an airplane shaft. The input shaft may be located independently from the armature shaft.

8 Claims, 35 Drawing Sheets

(56) References Cited

U.S. PATENT DOCUMENTS

| | | |
|---|---|---|
| 9,091,310 B2 * | 7/2015 | Yazdani .................. F16D 1/104 |
| 10,148,139 B2 * | 12/2018 | Lauk ........................ H02K 1/24 |
| 11,078,888 B2 * | 8/2021 | Klein-Hitpass ........... F16H 1/46 |
| 2004/0182670 A1 * | 9/2004 | Nojiri ................... F16D 41/088 |
| | | 192/84.8 |
| 2007/0169357 A1 | 7/2007 | Yazdani |
| 2013/0001952 A1 * | 1/2013 | Paweletz ................. F03D 15/00 |
| | | 290/55 |
| 2013/0221954 A1 | 8/2013 | Yazdani |
| 2015/0042321 A1 | 2/2015 | Yazdani et al. |
| 2020/0182308 A1 * | 6/2020 | Hornbrook ............. F16D 27/14 |
| 2022/0161621 A1 * | 5/2022 | Verdyan ................. H02K 7/116 |
| 2022/0166299 A1 * | 5/2022 | Hermann ............ H02K 11/215 |

OTHER PUBLICATIONS

European Extended Search Report issued in EP Application No. 22154115.4 on May 27, 2022.

* cited by examiner

DUAL ROTARY VARIABLE DIFFERENTIAL TRANSDUCER

RELATED APPLICATIONS

The subject application claims the benefit of U.S. Provisional Application having Ser. No. 63/143,063, filed 29 Jan. 2021. The entire content of which is herein incorporated by reference.

TECHNICAL FIELD

The present disclosure generally applies to the field of transformers and transducer assemblies.

BACKGROUND

A rotary variable differential transformer (RVDT) is a type of electrical transformer used for measuring angular displacement. The transformer includes a rotor that may be turned by an external force. The transformer acts as an electromechanical transducer that outputs an alternating current (AC) voltage proportional to the angular displacement of its rotor shaft.

In operation, an alternating current (AC) voltage may be applied to the transformer primary to energize the RVDT. When energized with a constant AC voltage, the transfer function (output voltage vs. shaft angular displacement) of any particular RVDT is linear (to within a specified tolerance) over a specified range of angular displacement.

RVDTs employ contactless, electromagnetic coupling, which provides long life and reliable, repeatable position sensing with high resolution, even under extreme operating conditions. Most RVDTs consist of a wound, laminated stator and a salient two-pole rotor. The stator, containing four slots, contains both the primary winding and the two secondary windings, which may be connected together in some cases. RVDTs offer advantages such as sturdiness, relatively low cost, small size, and low sensitivity to temperature, primary voltage and frequency variations.

SUMMARY OF THE DISCLOSURE

As will be discussed in greater detail below, in some implementations of the present disclosure a rotary variable differential transducer is provided. The transducer may include a housing and an armature shaft included within the housing. The transducer may further include an input shaft configured to mate with an airplane shaft. The input shaft may be located independently from the armature shaft.

Some or all of the following features may be included. The at least one end of the input shaft may include a flexible spline. The input shaft may be in contact with a plurality of ball bearings. The transducer may include a spring energized lip seal located on the input shaft proximate an end of the input shaft configured to mate with the airplane shaft. The transducer may also include a segmented anti-backlash gear attached to the armature shaft. The transducer may further include at least one stop pin configured to restrict movement of the segmented anti-backlash gear. The housing may include a slotted flange located at a base of the housing. A pinion gear shaft assembly may be included that may be configured to drive the segmented anti-backlash gear. In some embodiments, any rotation of the input shaft may be translated to the pinion gear shaft assembly. The rotation may be reduced by a gear ratio value and transferred to the armature shaft.

In another implementation, a rotary variable differential transducer is provided. The transducer may include an upper transducer assembly and a gear box assembly configured to mate with the upper transducer assembly. The transducer may further include an anti-backlash gearbox assembly included within the gearbox assembly. The anti-backlash gearbox assembly may include one or more pre-loaded springs, a fixed gear that is fixed to a rotating shaft and a free gear configured to rotate about the rotating shaft. The anti-backlash gearbox assembly may be configured to engage with a solid mating gear associated with an aircraft landing gear column.

Some or all of the following features may be included. The one or more pre-loaded springs may include C-springs. The fixed gear and the free gear may include an aperture configured to receive a temporary null lock pin. The temporary null lock pin may be welded to the fixed gear and floating within the free gear. The upper transducer assembly may be a dual tandem a rotary variable differential transducer. The transducer may further include a mounting flange located on a base portion located between the upper transducer assembly and the gearbox assembly. The transducer may also include a plurality of locator pins affixed to the base portion. The transducer may also include a visible indicator tab attached to an armature shaft, wherein the visible indicator tab may be visible through a window. The transducer may further include a drain hole located within a bottom portion of the gearbox assembly.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

Like reference symbols in FIGS. 1-17 in the various drawings may indicate like elements (similar with FIGS. 18-35).

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Referring now to FIGS. 1-17, embodiments of the present disclosure provide a dual RVDT that may include a dual load path and an anti-backlash input gear mechanism. In some embodiments, the transducer assembly described herein may be specifically designed for measuring the angle of rotation of a nose landing gear ("NLG") of an aircraft. The transducer may include a dual-cycle, duplex-channel RVDT. The dual-cycle or single-cycle, duplex-channel RVDT may include a connector in line with the axis of the shaft rotation. In some embodiments, the RVDT may be attached to an anti-backlash gear assembly as is discussed in further detail hereinbelow.

Figure 1:
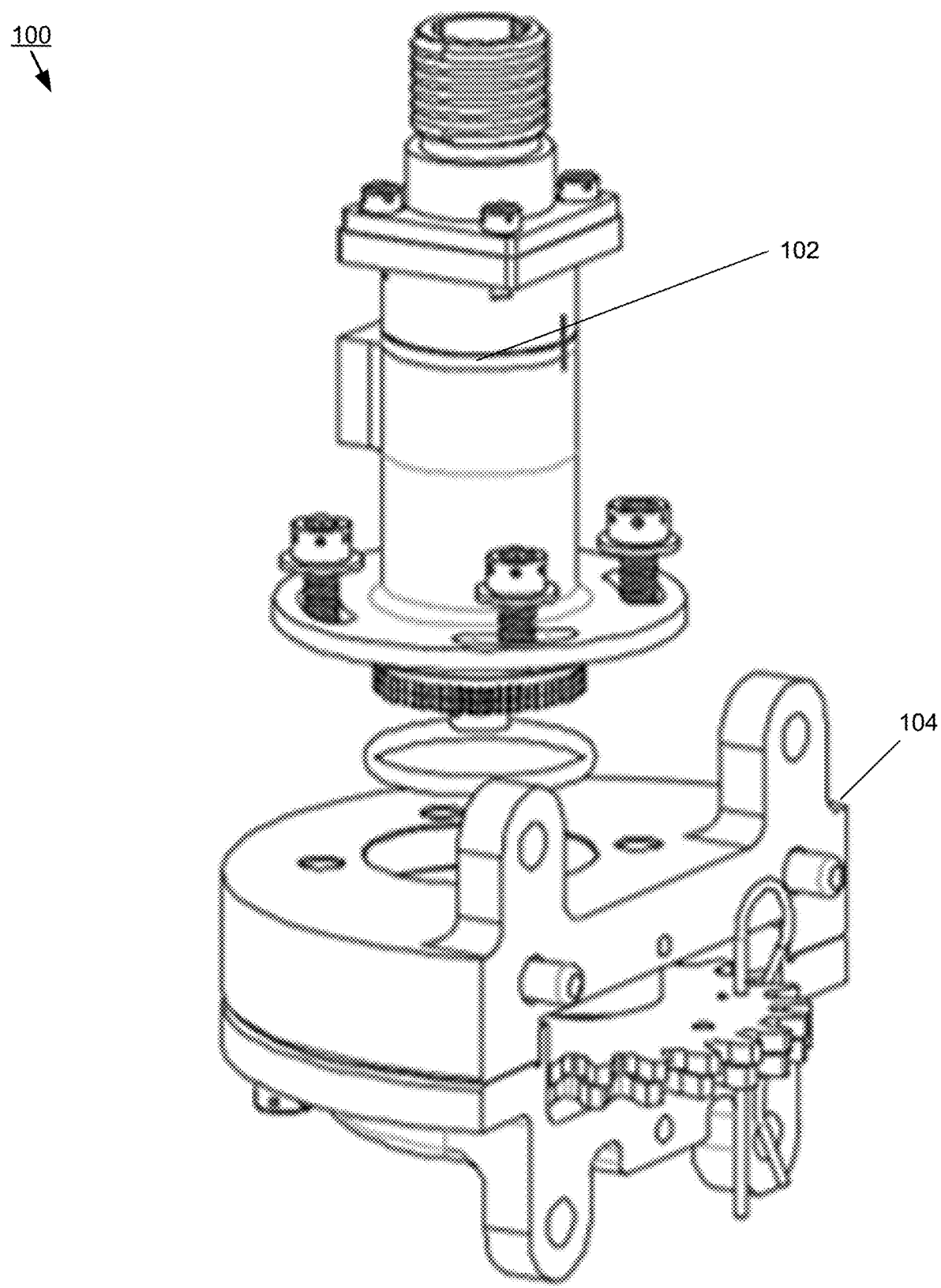
FIG. 1 illustrates a partially exploded view of an RVDT consistent with embodiments of the present disclosure.

As shown in FIG. 1, an embodiment showing an example rotary variable differential transducer 100 is provided. Transducer 100 may include upper transducer assembly 102, which may include a dual, tandem RVDT. FIG. 1 shows an exploded view where upper transducer assembly 102 has not been affixed to gear box assembly 104. Transducer assembly 102 may be configured to mate with gear box assembly 104 using any suitable approach, some of which may include, but are not limited to, the screws depicted in FIG. 1.

Figure 2:
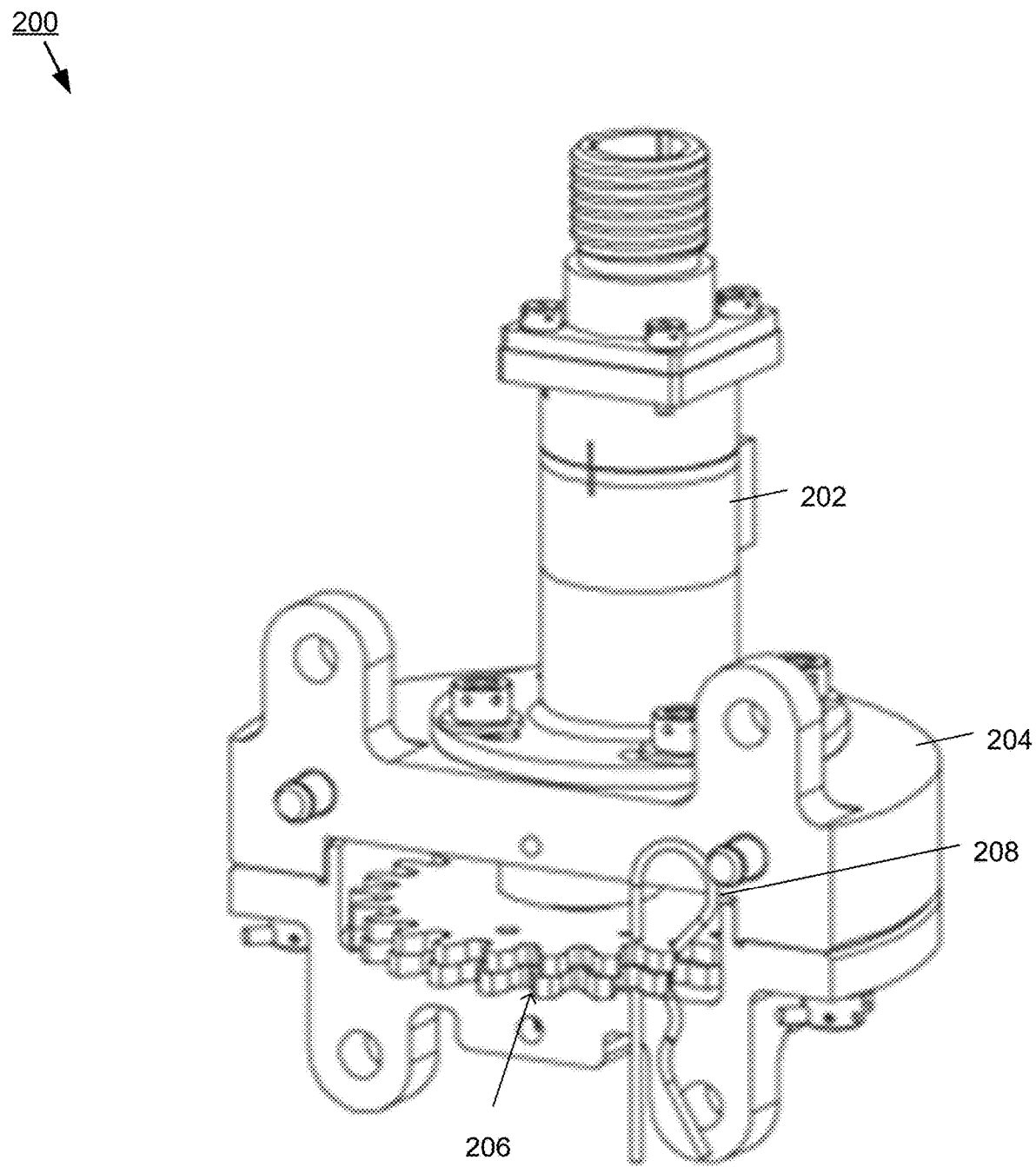
FIG. 2 illustrates an RVDT consistent with embodiments of the present disclosure.

In some embodiments, and referring now to FIG. 2, an embodiment showing transducer 200, and more specifically, upper transducer assembly 202 after being affixed to gear box assembly 104 is provided. Transducer 200 may further include input gear 206 included within gearbox assembly 204. Input gear 206 may be provided with temporary null lock pin 208, which may be removed after installation. In some embodiments, input gear 206 may be configured to engage with a solid mating gear associated with an aircraft landing gear column.

Figure 3:
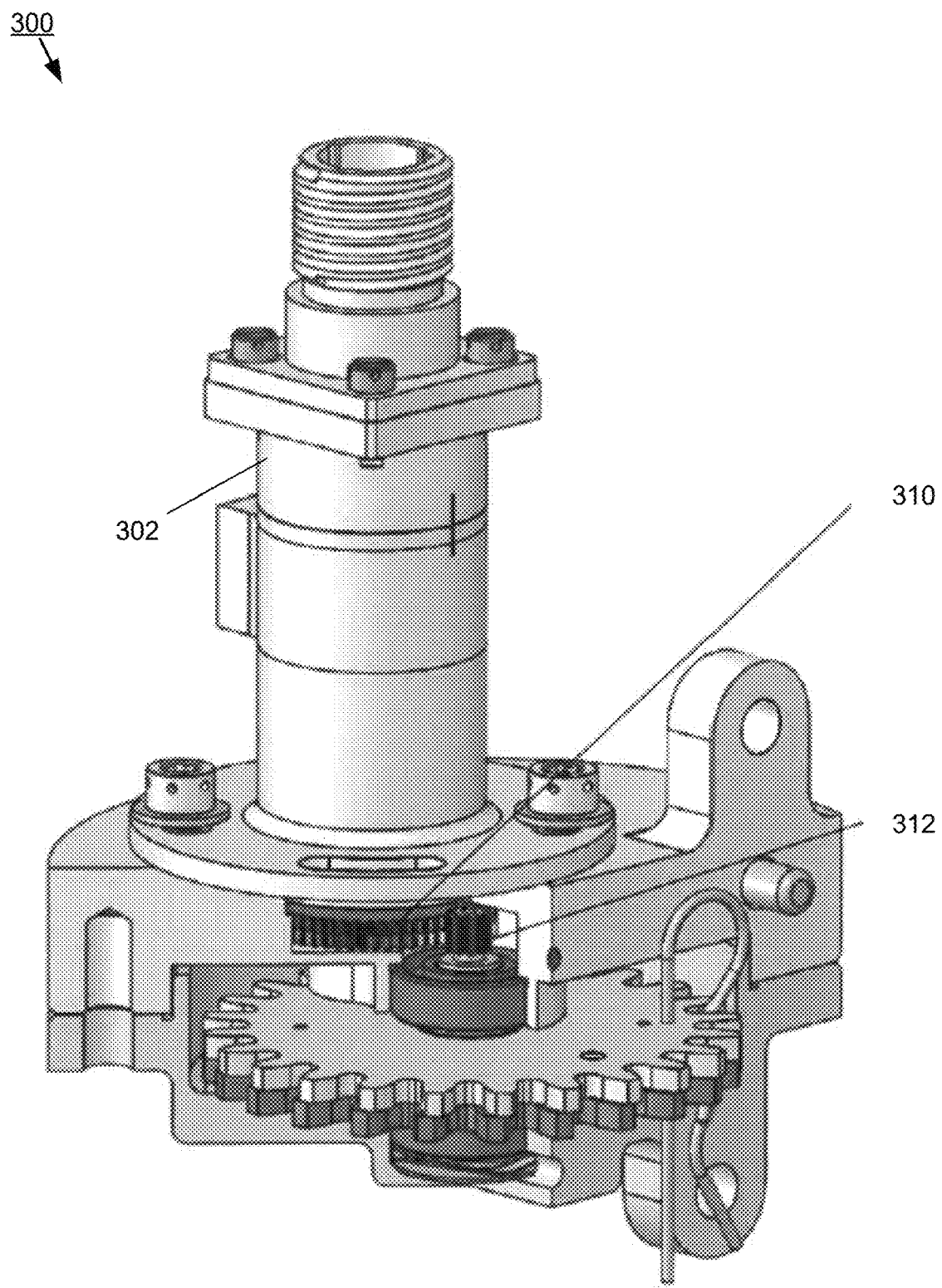
FIG. 3 illustrates an RVDT consistent with embodiments of the present disclosure.

Referring also to FIG. 3, an embodiment showing an example transducer 300 is provided. In this embodiment, anti-backlash gear 310 is shown attached to the RVDT shaft included within upper transducer assembly 302. Anti-backlash gear 310 may be attached to the RVDT and may be actuated by a second gear assembly associated with input gear 206. It should be noted that anti-backlash gear 310 may include one or more gears. As shown in FIG. 3, second gear assembly may include pinion shaft 312, which may be in mechanical communication with anti-backlash gear 310. In operation, pinion shaft 312 may be used for gear reduction from the input gear to RVDT gear. Gear box assembly 204 may include the second gear assembly, which may include a dual load-path-anti-backlash mechanism. The anti-backlash mechanism of the second gear assembly may include two or more pre-loaded springs as are discussed in further detail below with reference to FIG. 4.

Figure 4:
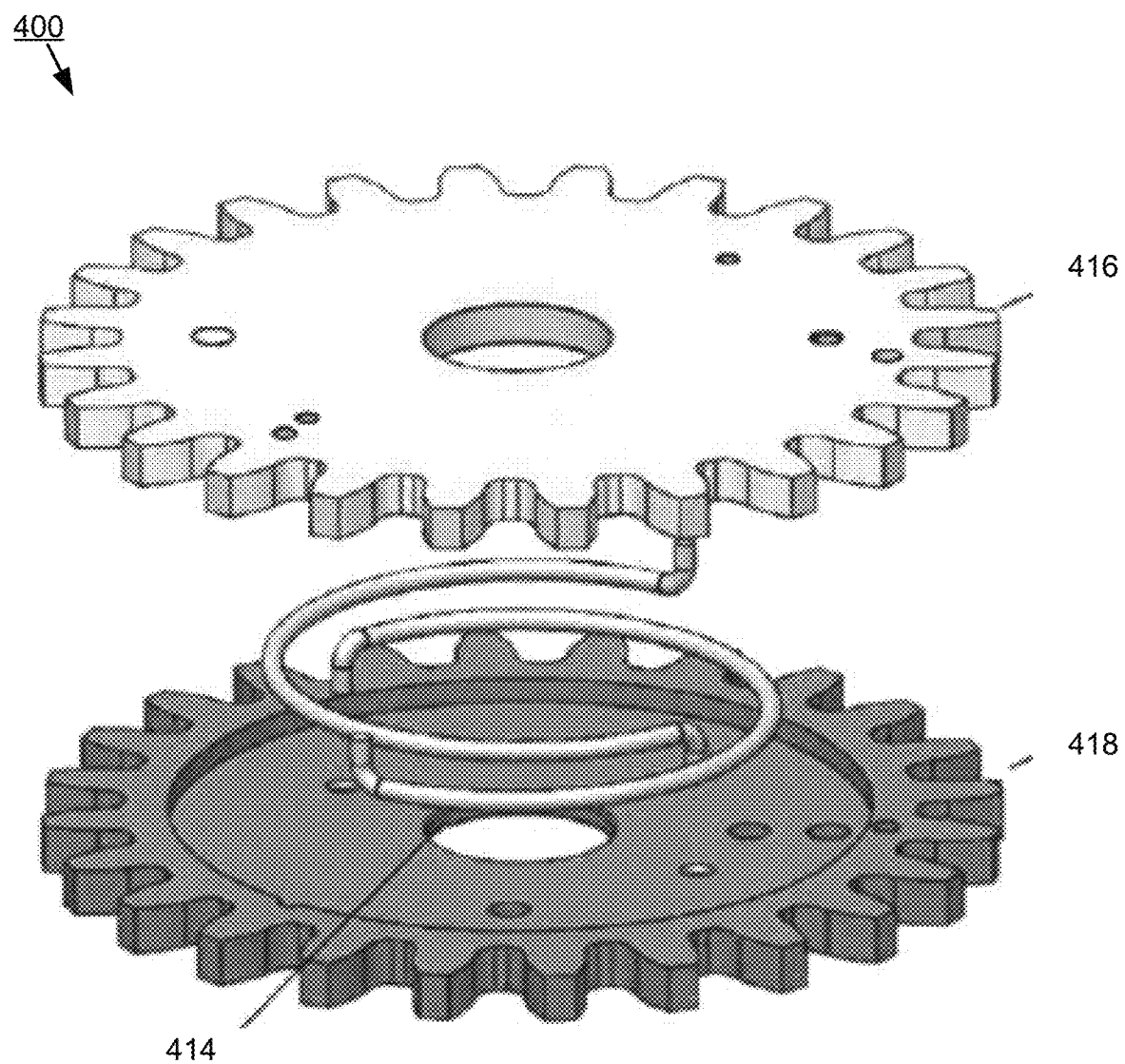
FIGS. 4-7 illustrate gears consistent with embodiments of the present disclosure.

Referring also to FIG. 4, a diagram 400 showing examples of gears that may be used in association with gear box assembly 104 are provided. Input gear 206 may include one or more pre-loaded springs 414 as shown in FIG. 4. Numerous spring types may be used without departing from the scope of the present disclosure, including, but not limited to, the dual C-springs shown. In operation, springs 414 may be configured to provide anti-backlash redundancy and they may be configured to operate independently from one another. Fixed gear 416 may be affixed to the main rotating shaft using any suitable approach such as welding, other mechanical means, etc. Free gear 418 may be generally similar in size and shape to fixed gear 416 and it may be configured to rotate about the main rotating shaft.

Figure 5:
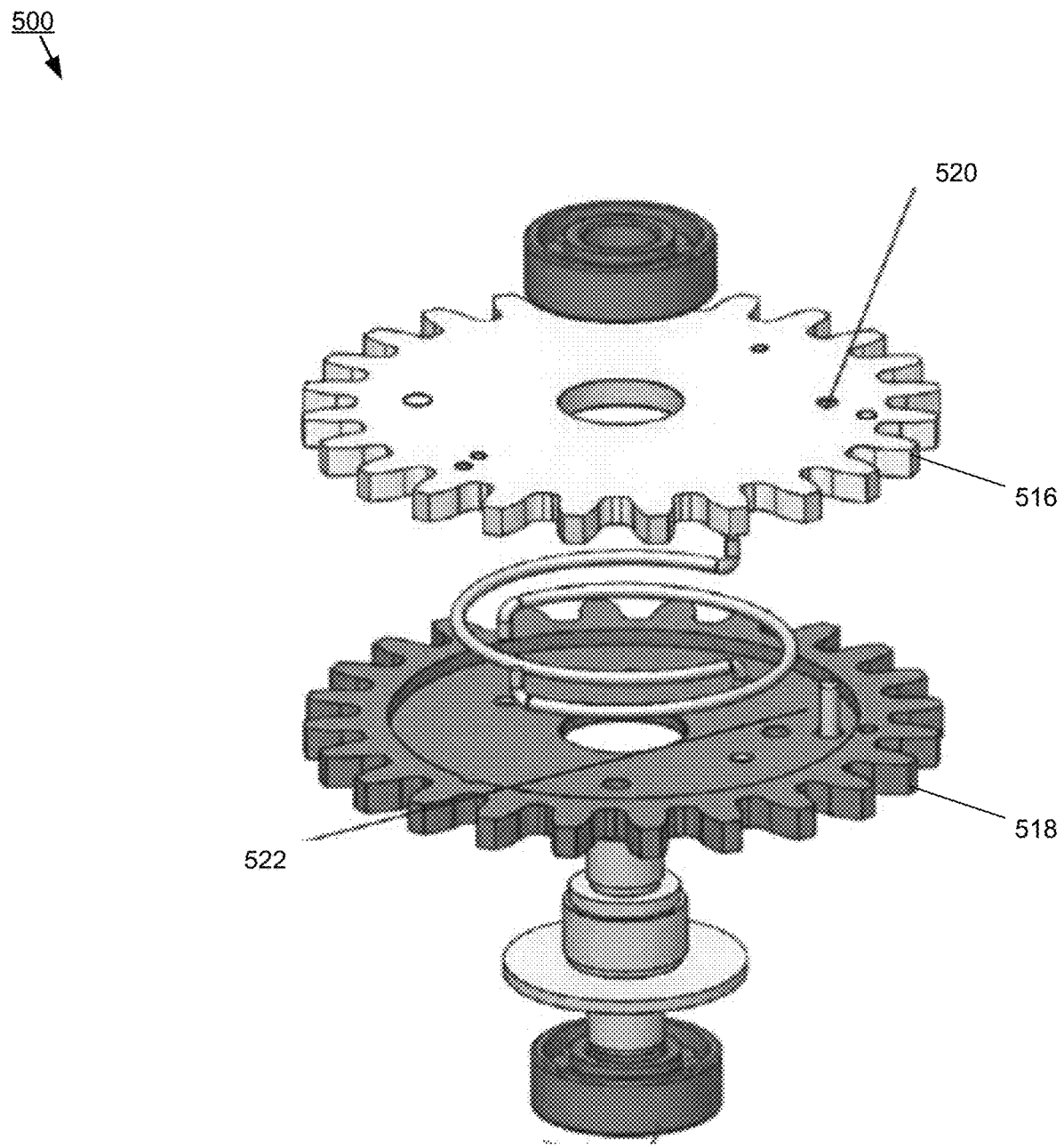

Referring also to FIG. 5, another diagram 500 showing examples of gears that may be used in association with input gear 206 associated with anti-backlash gear assembly is provided. In some embodiments, fixed gear 516 and the free gear 518 may each include one or more apertures 520, 522 configured to receive one or more null lock spring-pins. Accordingly, the anti-backlash mechanism associated with input gear 206 may include two gears. Fixed gear 516 may be fixed to the rotating shaft and free gear 518 may rotate freely. In some embodiments, gears 516, 518 may be gear halves. In some embodiments, free gear 518 may be pre-loaded against fixed gear 516. Gears 516, 518 may include a holding pin configured to hold the gears together. The pin may pass through both gears. To permanently hold the gears in the pre-loaded position, one end of the holding pin may be welded to fixed gear 516 while the other end is freely inside a hole within free gear 518. The size of the hole may be predetermined such that will allow free gear 518 and fixed gear 516 to slightly rotate against one another. However, the mismatch of the two teeth that may occur from rotation of free gear 518 and fixed gear 516 against one another may be small enough to allow free gear 518 and fixed gear 516 to perfectly align and easily engage onto a solid mating gear. The solid mating gear may be installed on the nose landing gear column.

Figure 6:
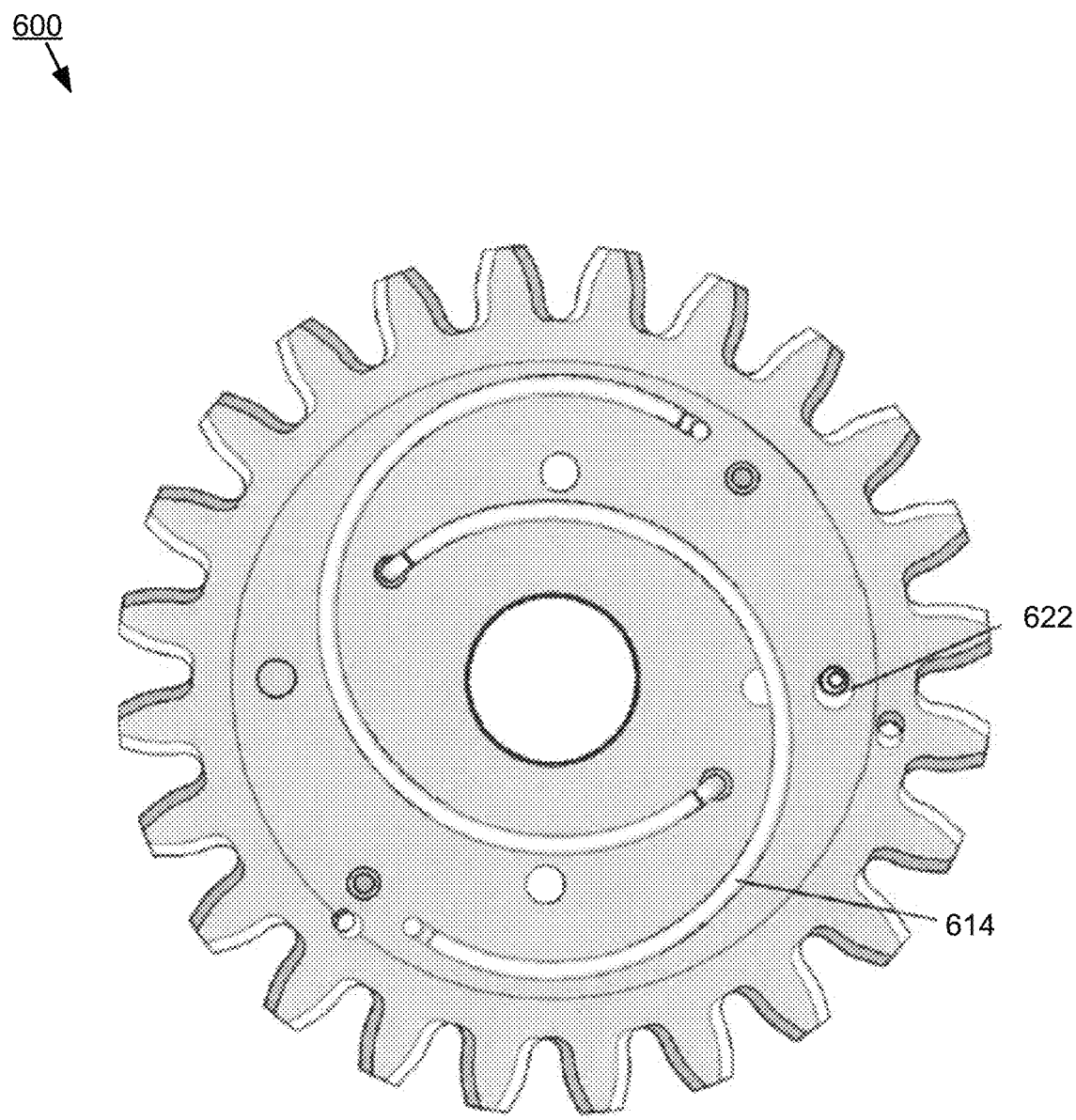

For example, in some embodiments a temporary null lock pin may be located within aperture 520 and a permanent null lock pin may be welded onto fixed gear 516 and may be floating within free gear 518. The anti-backlash pin may be welded onto the fixed gear while the null-lock spring pin may be temporary and may be removed following installation associated with the nose landing gear. FIG. 6 shows an example with null lock pin 622 floating at one end as well as dual C-springs 614 configured to provide redundancy to anti-backlash feature of the gear.

Figure 7:
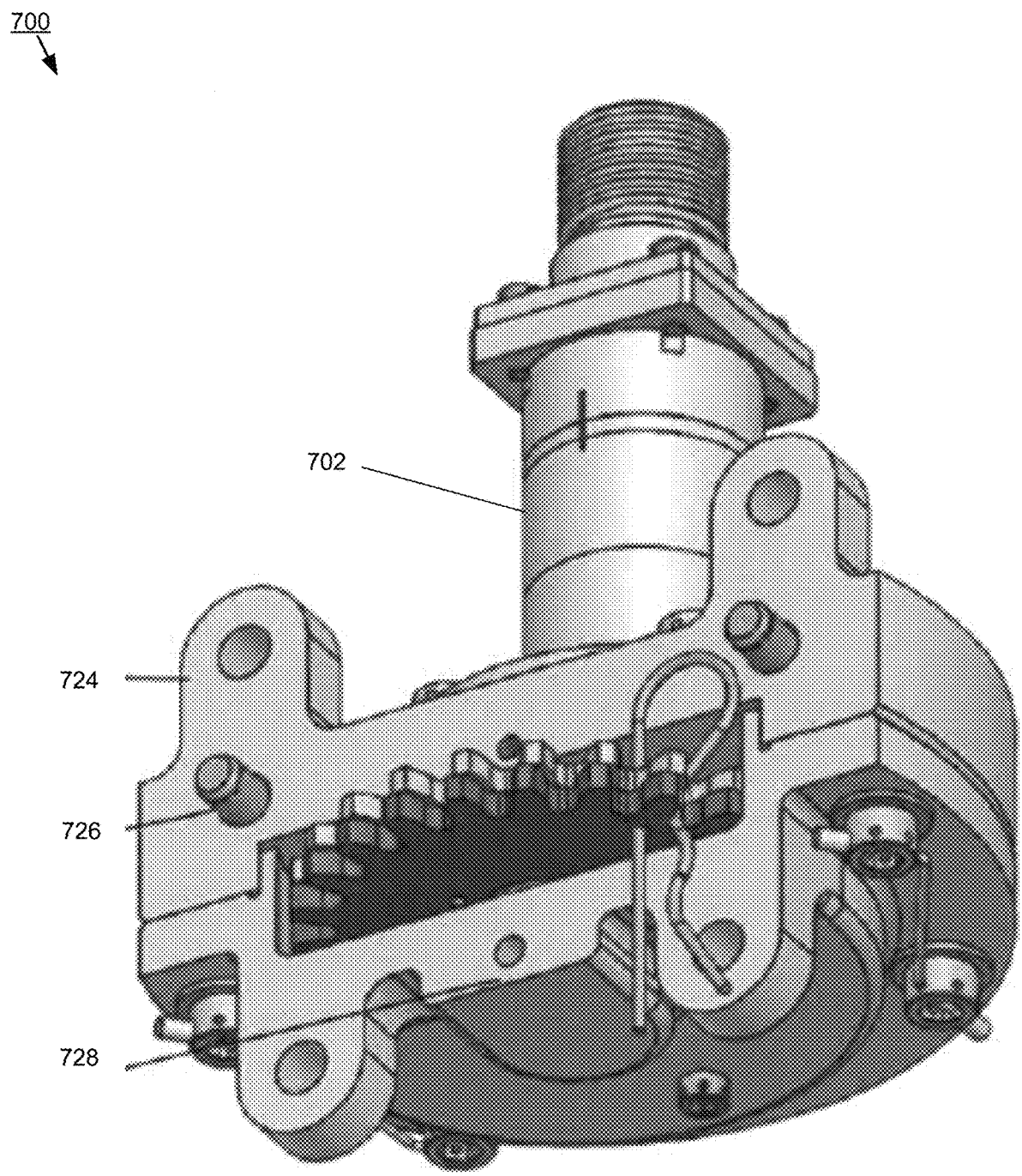

Referring also to FIG. 7, an embodiment showing an example transducer 700 is provided. In this particular embodiment, mounting flange 724 is shown on a top portion of gearbox assembly, which may be located beneath upper transducer assembly 702. The top portion may further include one or more apertures and one or more locator pins 726 affixed to base portion. Drain hole 728 may be located on the bottom portion of the gearbox assembly.

In some embodiments, drain hole 728 may be located directly under the main bearing shaft of the gear box assembly. Drain hole 728 may be configured to drain moisture collected in the cavities of the gear box assembly and/or the RVDT assembly back into the cavity of the nose landing gear. In some embodiments, drain hole 728 may include a 90-degree hole. In operation, drain hole 728 may be configured to prevent the icing of the anti-backlash gears during flight.

In some embodiments, one or more locator pins 726 may be next to the flange mounting apertures on the gear box assembly. In specific embodiments, gear box assembly may include two locator pins. One or more locator pins 726 may allow the correct assembly of the anti-backlash gear to the solid mating gear. One or more locator pins 726 may be configured to allow the mounting bolts to be tightened without affecting the position of the anti-backlash gear and the position of the solid mating gear respective to one another.

Figure 8:
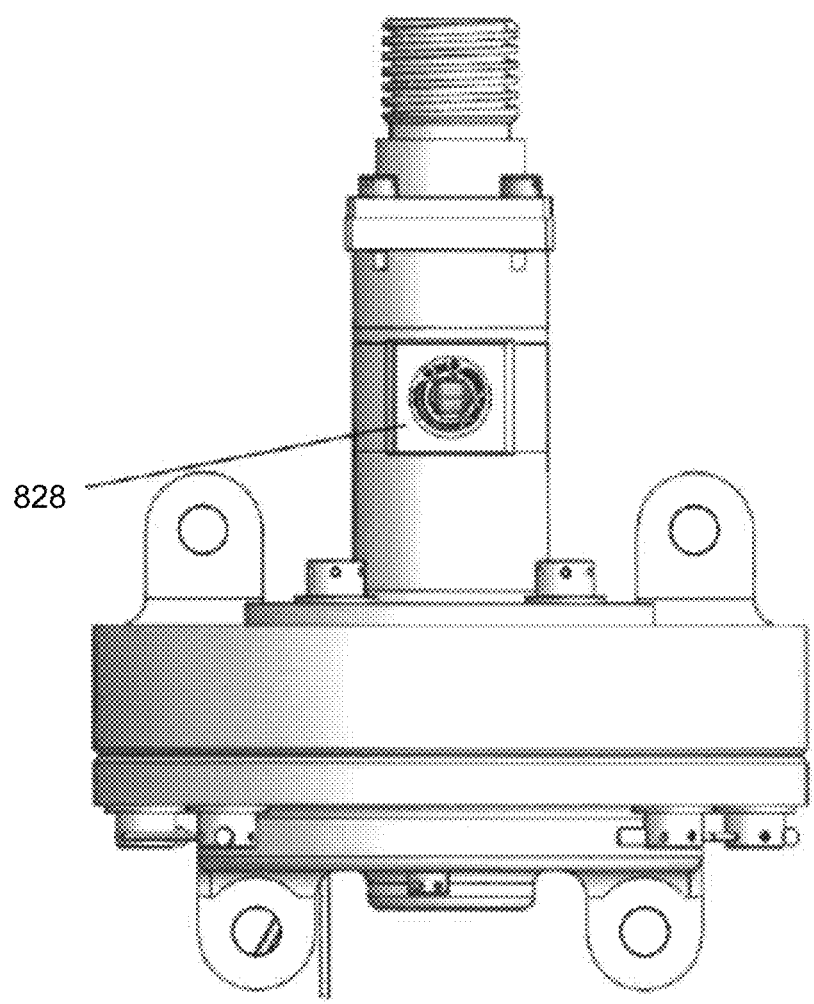
FIG. 8 illustrates an RVDT consistent with embodiments of the present disclosure.
Figure 9:
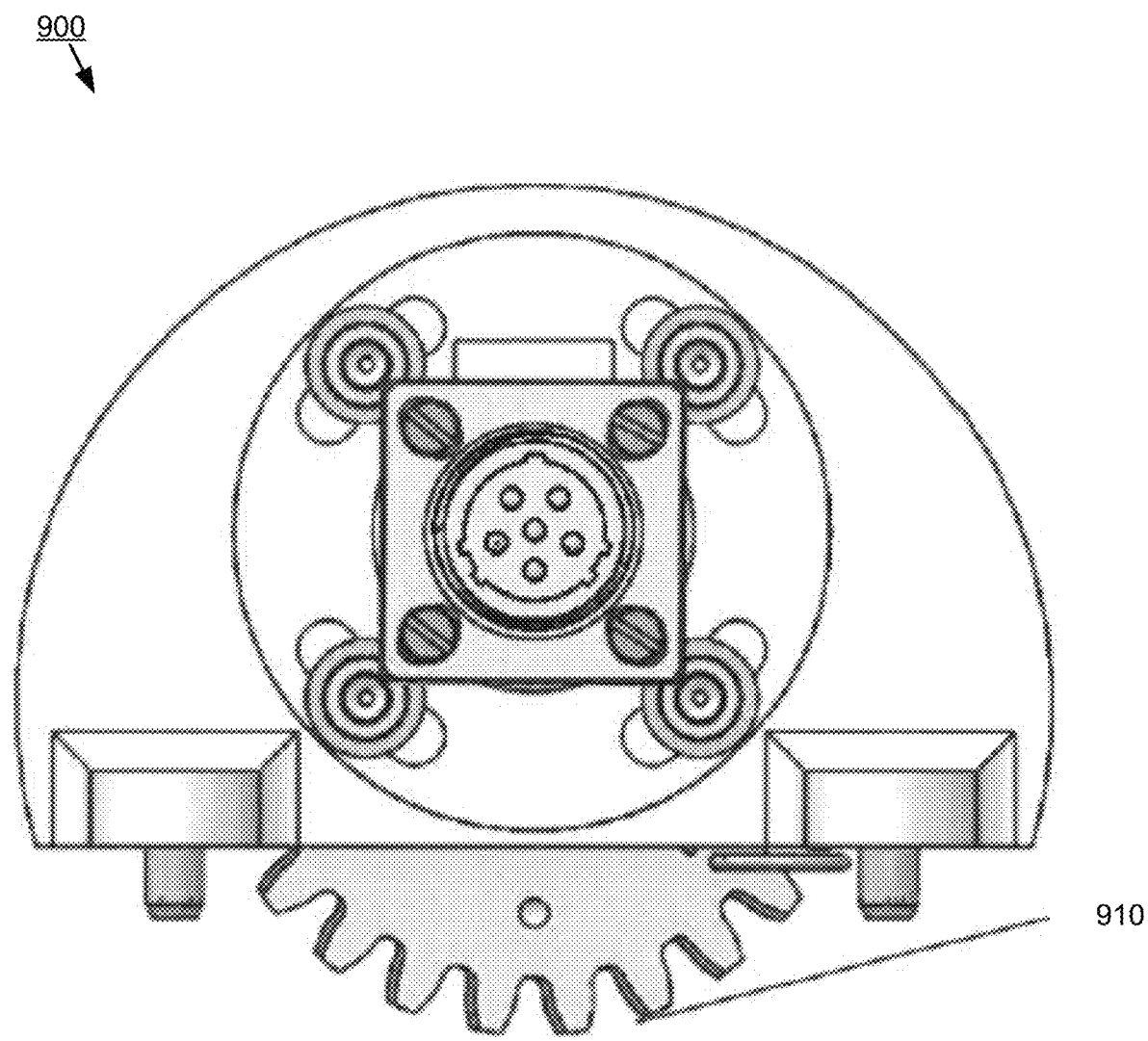
FIG. 9 illustrates a top view of an RVDT consistent with embodiments of the present disclosure.
Figure 10:
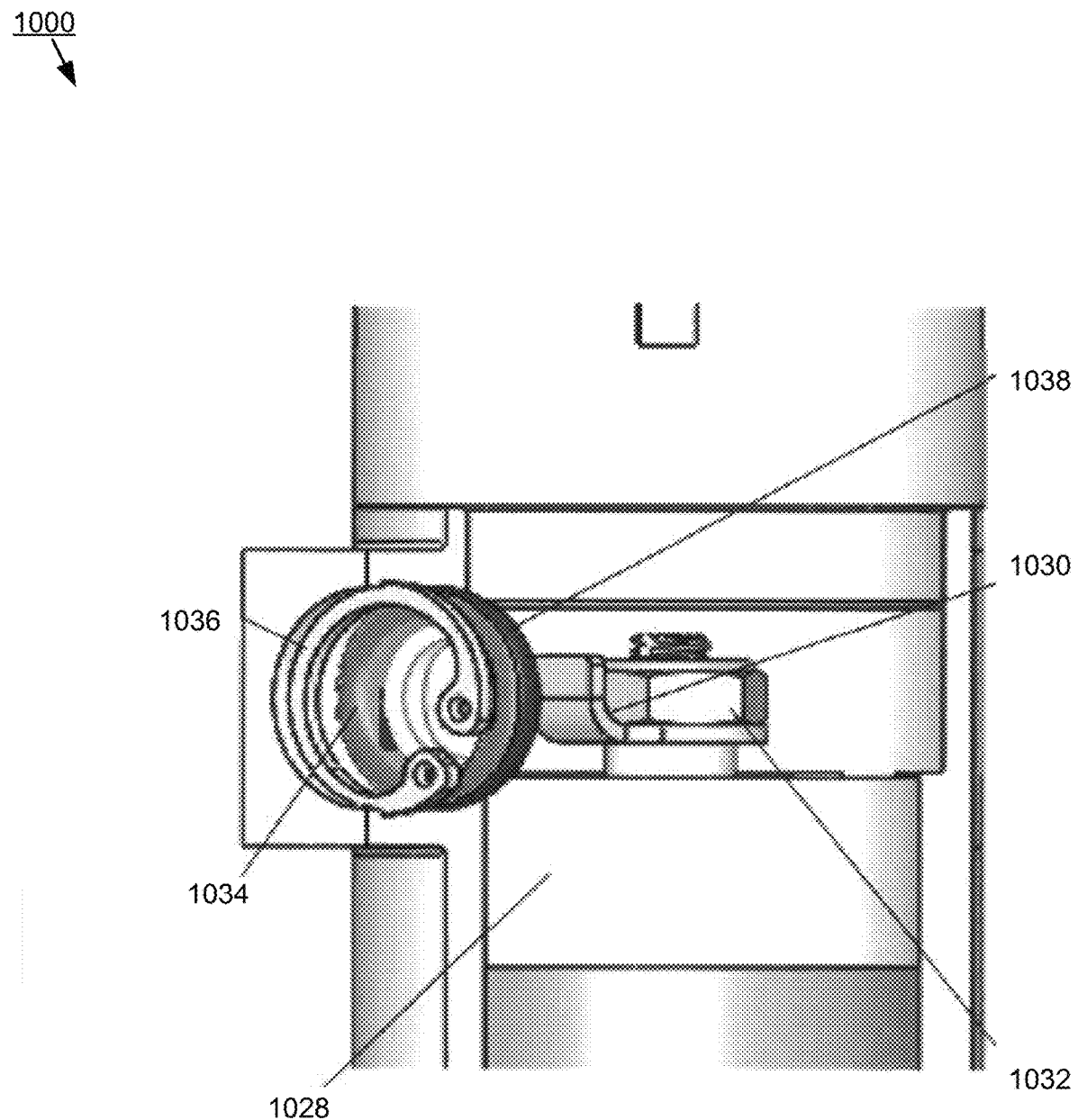
FIG. 10 illustrates a window associated with an RVDT consistent with embodiments of the present disclosure.

Referring now to FIGS. 8-10, an embodiment showing a transducer 800 including an environmentally sealed null visualization window 828 is provided. In operation, the RVDT may be at null when a colored tab (e.g., yellow) is visible. In some embodiments, a visible indicator tab may be attached to the armature shaft and may be visible through window 828. Typically, the null position of all RVDTs are indicated at the window directly behind the armature shaft. In the typical unit, the connector may be directly behind the armature shaft, thus the null indicator. In some embodiments of the present disclosure, an indicator tab may be attached to the RVDT armature shaft. The indicator tab may be colored to be clearly visible when looking through the side submarine window. Colors of the indicator tab may include, but are not limited to, yellow, red, etc. For example, if the colored indicator of the indicator tab appears behind the side submarine window, the RVDT is approximately at null position. The side submarine window may include a glass window and/or other materials to allow light to pass through to indicator tab. FIG. 9 shows an embodiment showing a top view of transducer 900 with anti-backlash input gear 910 is provided. Typically, the RVDTs have a Null mark on the rear end on them. There is a mark on the shaft and a mark on the RVDT body. This is where the RVDT may be rigged by the user on to the next assembly. In operation, when there is a connector perfectly located on the rear end of the RVDT (and the shaft) it is impossible to have a Null indicator mark. Accordingly, embodiments of the present disclosure may include a sealed submarine window on the side of the RVDT housing. When the highlighted yellow tab attached to the shaft is visualized in the submarine window, that indicates that the RVDT is in the "calibrated" quadrant and the user may electrically start to rig (null) the RVDT.

Referring now to FIG. 10, an embodiment showing a transducer 1000 in accordance with the present disclosure is provided. Null visualization window 1028 as well as null indication tab 1030 are provided. When tab 1030 is seen at window 1028, the RVDT is near the null position. Tab 1030 may be locked to RVDT shaft using any suitable approach such as nut 1032. Glass window 1034, retaining ring 1036, and O-ring 1038 may operate together to allow for visualization of tab 1030. Glass window 1034 may also be sealed with O-ring 1038 (or any suitable methodology) and may be configured to prevent the moisture intrusion into the RVDT cavity.

Figure 11:
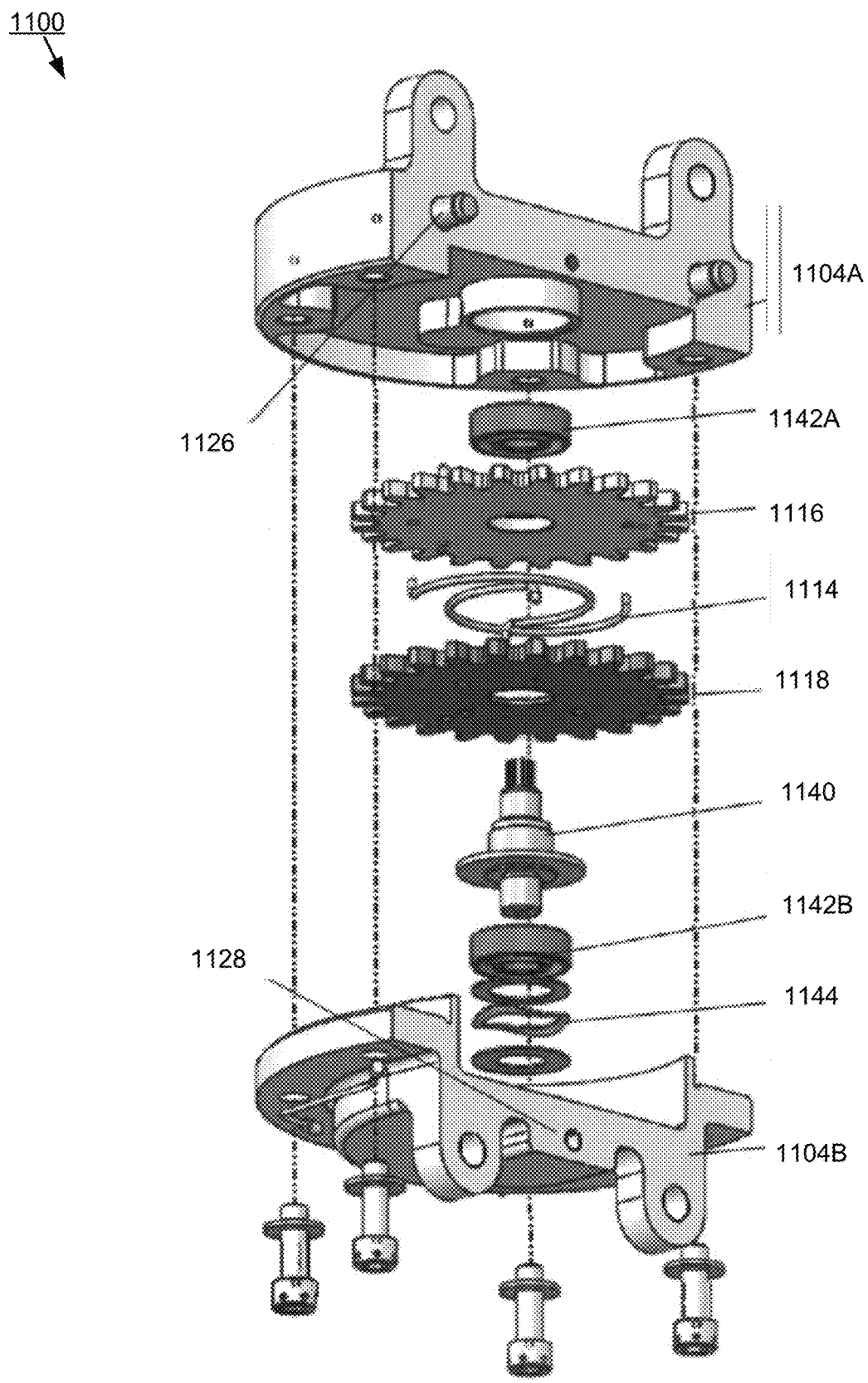
FIG. 11 illustrates an exploded view of an RVDT consistent with embodiments of the present disclosure.

Referring now to FIG. 11, an embodiment showing an exploded view of transducer 1100 is provided. Transducer 1100 includes gear box assembly 1104 (top portion 1104A and bottom portion 1104B). Fixed gear 1116, free gear 1118, and springs 1114 may be located therebetween. Main shaft 1140 may include one or more bearings 1142A and B as well as spring and shim washers 1144. Locator pins 1126 and drain hole 1128 are also depicted.

Figure 12:
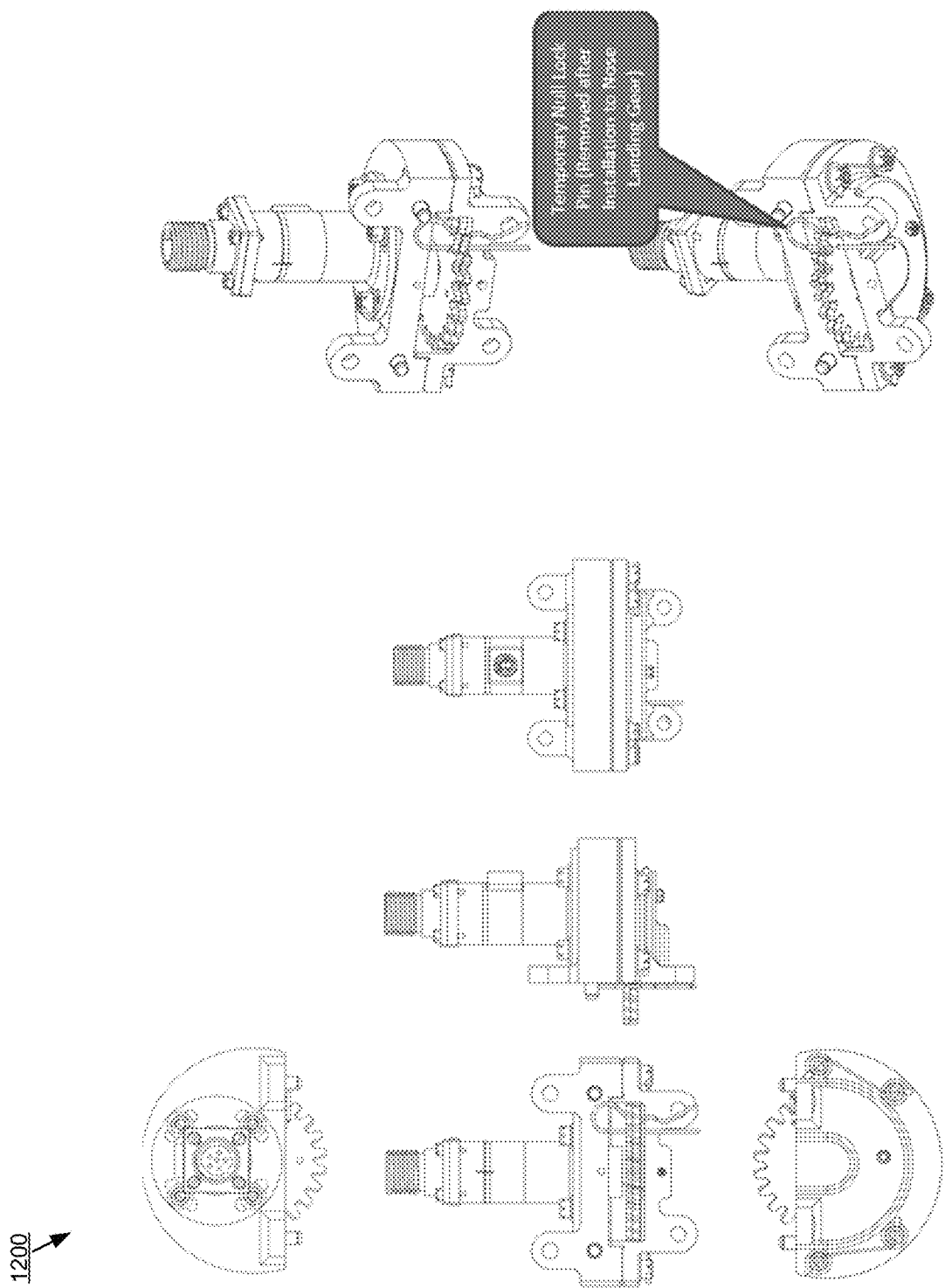
FIGS. 12-17 provide additional embodiments and views of an RVDT and associated components.
Figure 13:
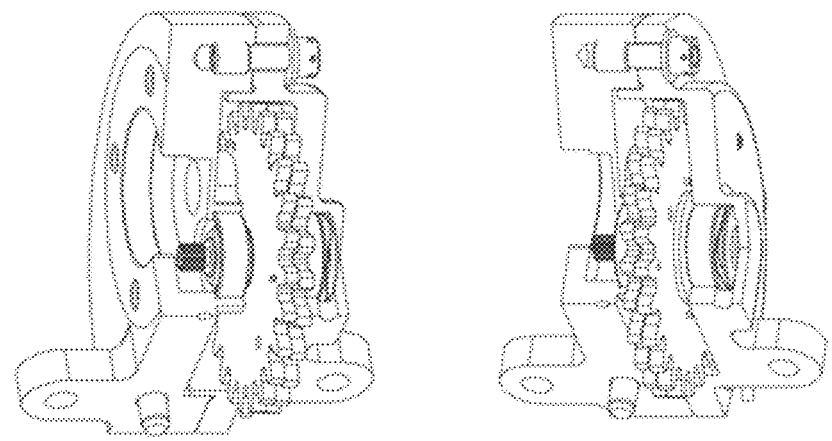
Figure 13:
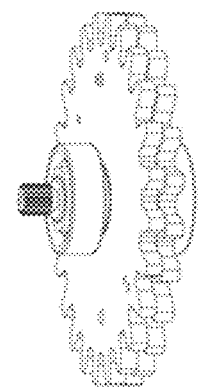
Figure 13:
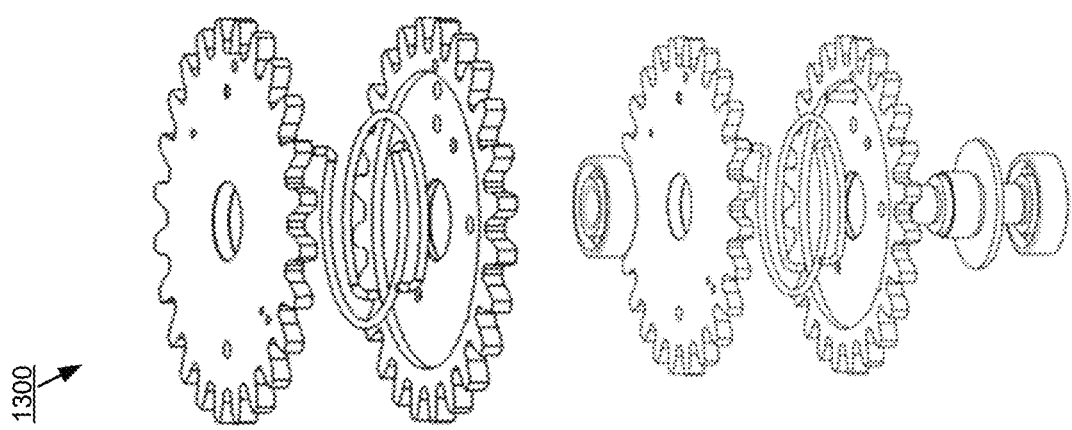
Figure 14:
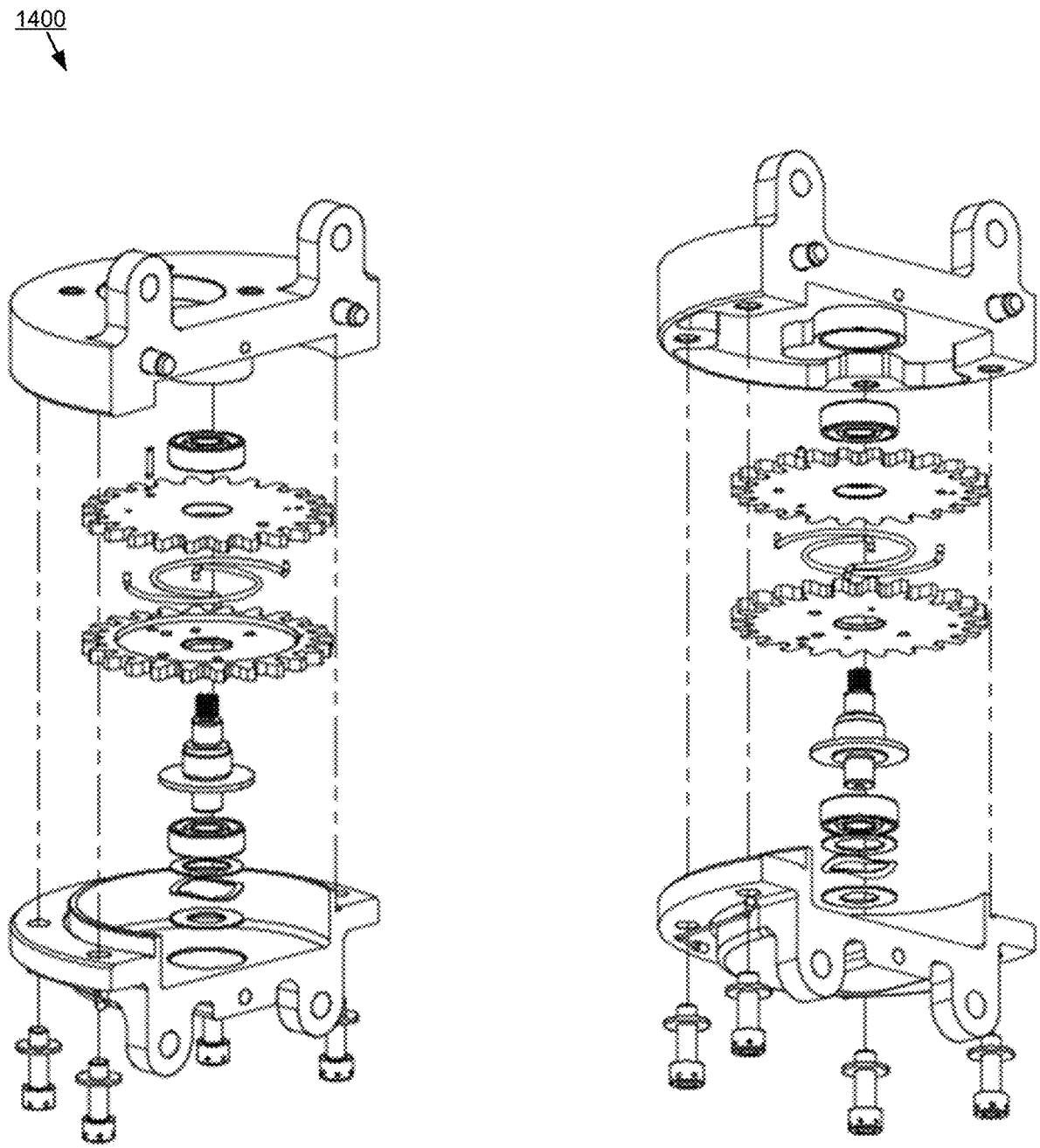
Figure 15:
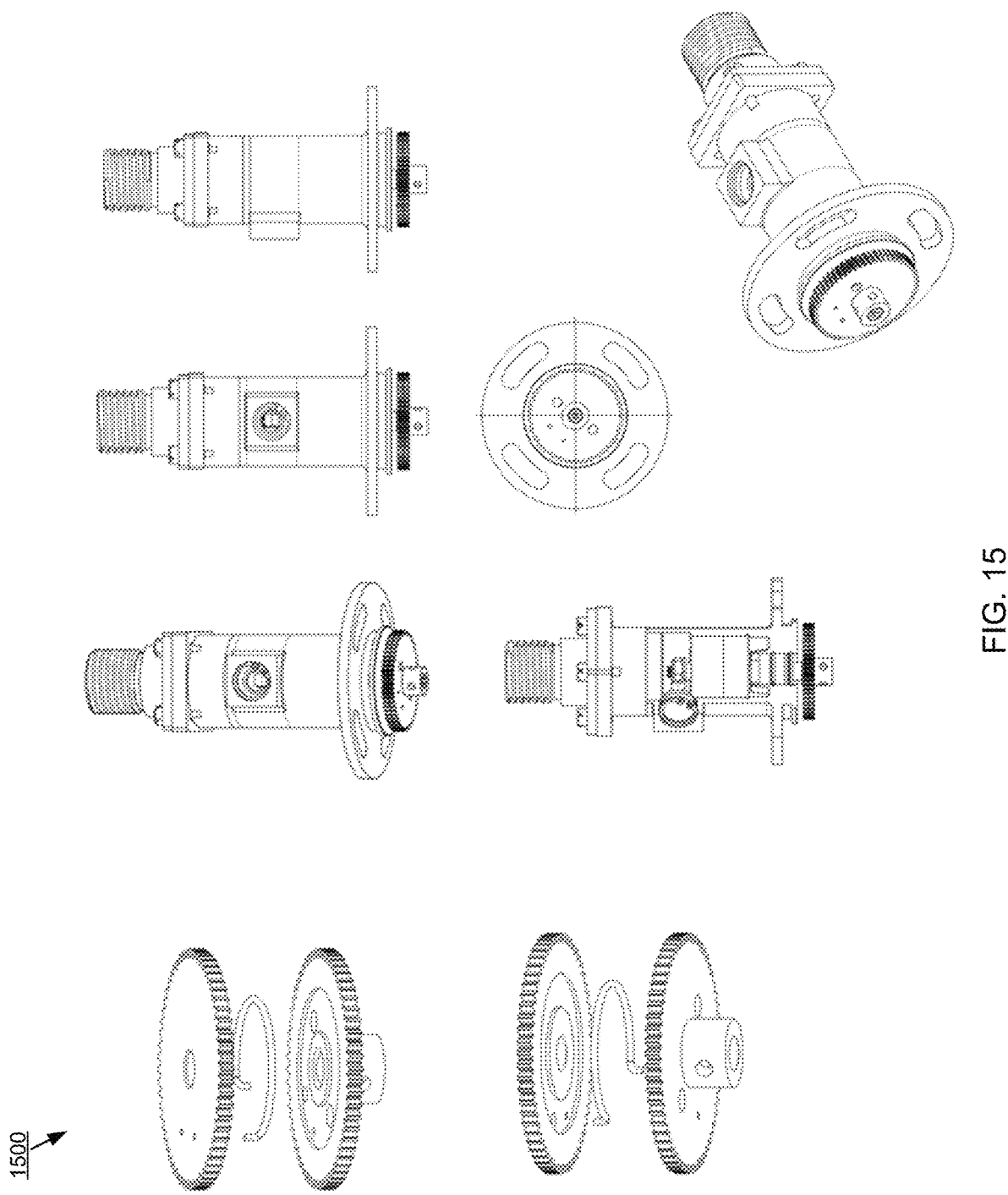
Figure 16:
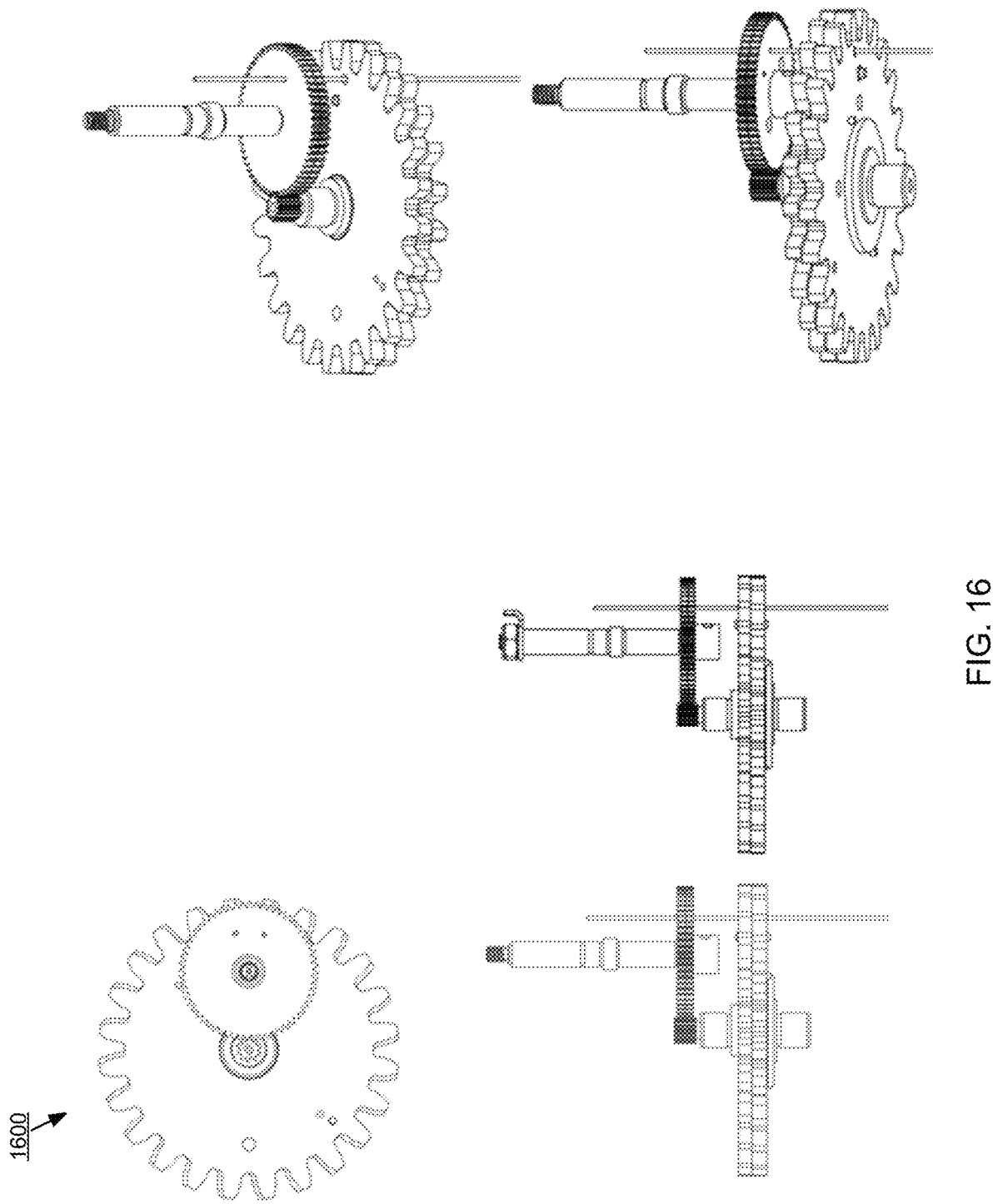
Figure 17:
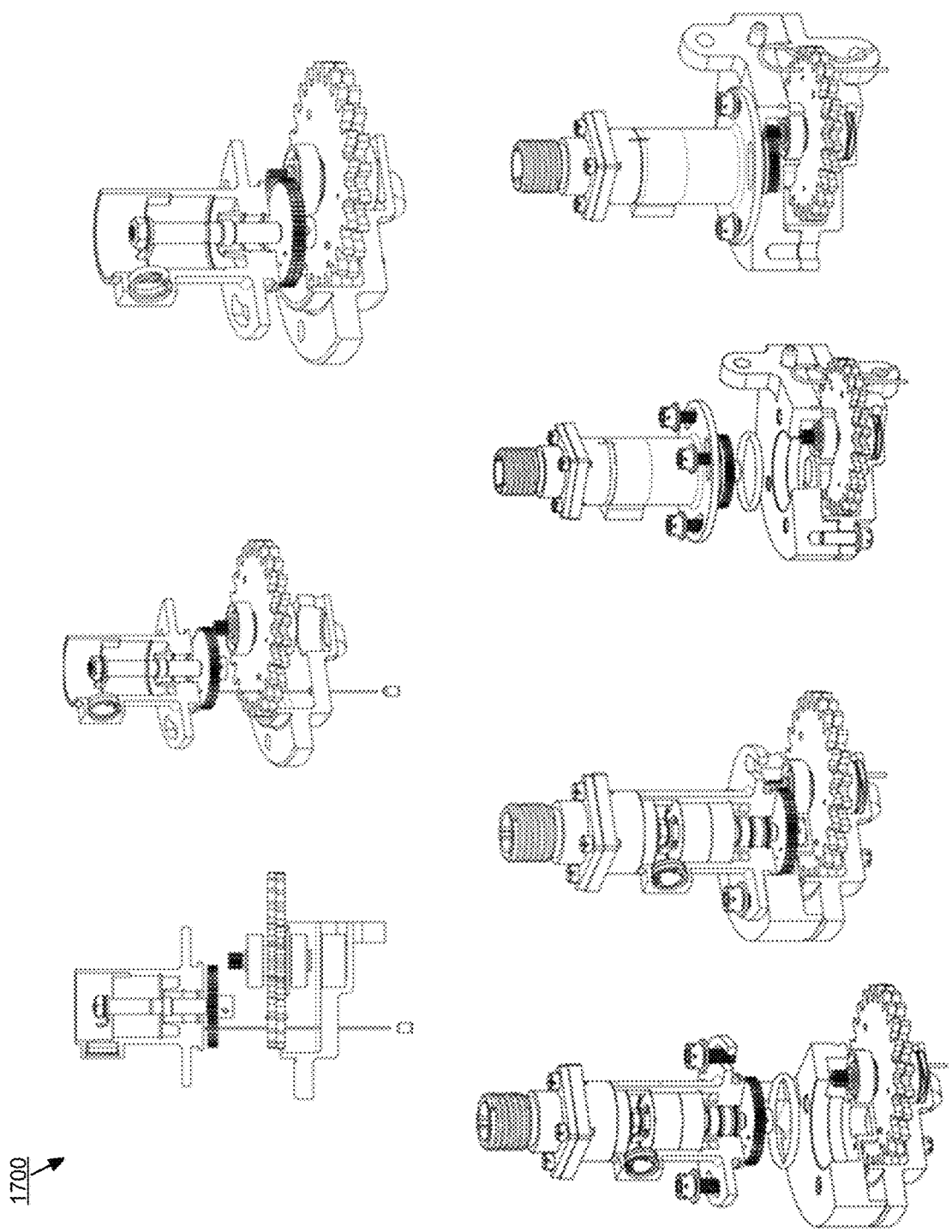

FIGS. 12-17 provide additional embodiments consistent with the RVDT described herein. FIG. 12 depicts examples of transducers 1200 including a temporary null lock pin that may be removed after installation to the nose landing gear. FIG. 13 depicts an example showing examples of gears and springs that may be used in association with embodiments of the present disclosure. FIG. 14 depicts an exploded view of transducer 1400 consistent with embodiments of the present disclosure. FIG. 15 depicts an example of a transducer 1500 having a visualization window. FIGS. 16-17 show examples of gears 1600 and transducer 1700 consistent with embodiments of the present disclosure.

Referring now to FIGS. 18-35, embodiments of the present disclosure directed towards a high accuracy, dual channel RVDT with a single-stage zero-backlash gear reducer assembly are provided. In some embodiments, the RVDT may be connected to a gear reducer assembly. The gear reducer assembly may include an anti-backlash gear connected to the RVDT. The anti-backlash gear may be driven by a pinion gear-shaft assembly thereby creating a single stage gear reducer assembly. The single stage gear reducer assembly may increase the operating range of the RVDT. In some embodiments, the single stage gear reducer assembly may increase the operating range of the RVDT to ±110° from the maximum linear RVDT range of dual-cycle RVDT) (±40°). This can be dual cycle or single cycle RVDT (+/−80). The range could be +/−110 degrees or more, depending on the gear ratio. The RVDT may be configured for aircraft rotary measurement applications requiring a linear range of ±180° with high accuracy and no backlash. The RVDT may be environmentally sealed per aerospace standards.

In some embodiments, the input shaft may be inserted into the mating spline shaft on the aircraft. The rotation may be translated to the pinion gear-shaft assembly. The rotation may then be reduced by the gear ratio value and transferred to the RVDT armature-shaft assembly. The RVDT may provide the angular measurement by transmitting an output voltage proportional to the measured angle.

Figure 18:
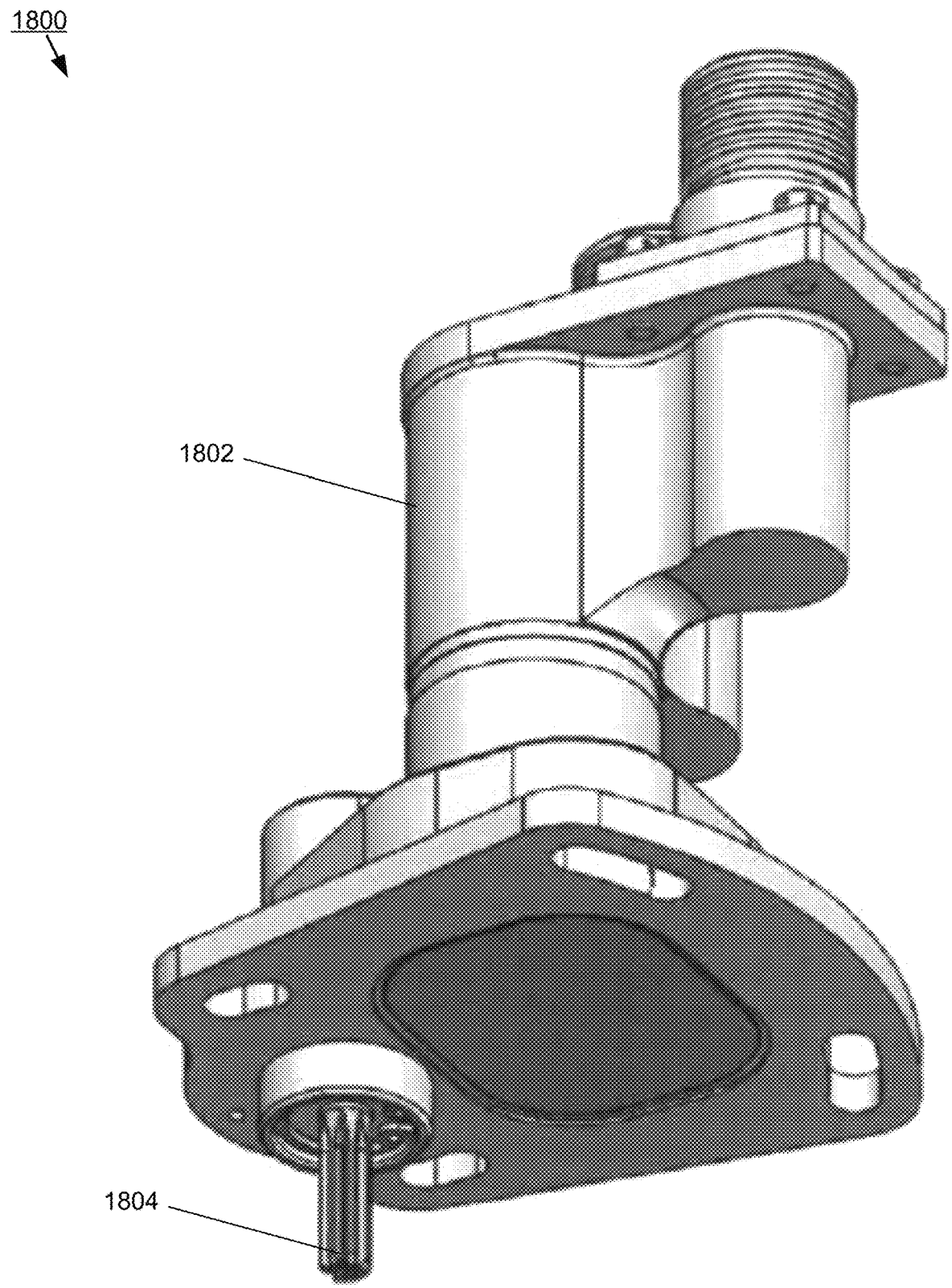
FIGS. 18-35 illustrate an RVDT and associated components consistent with embodiments of the present disclosure.
Figure 19:
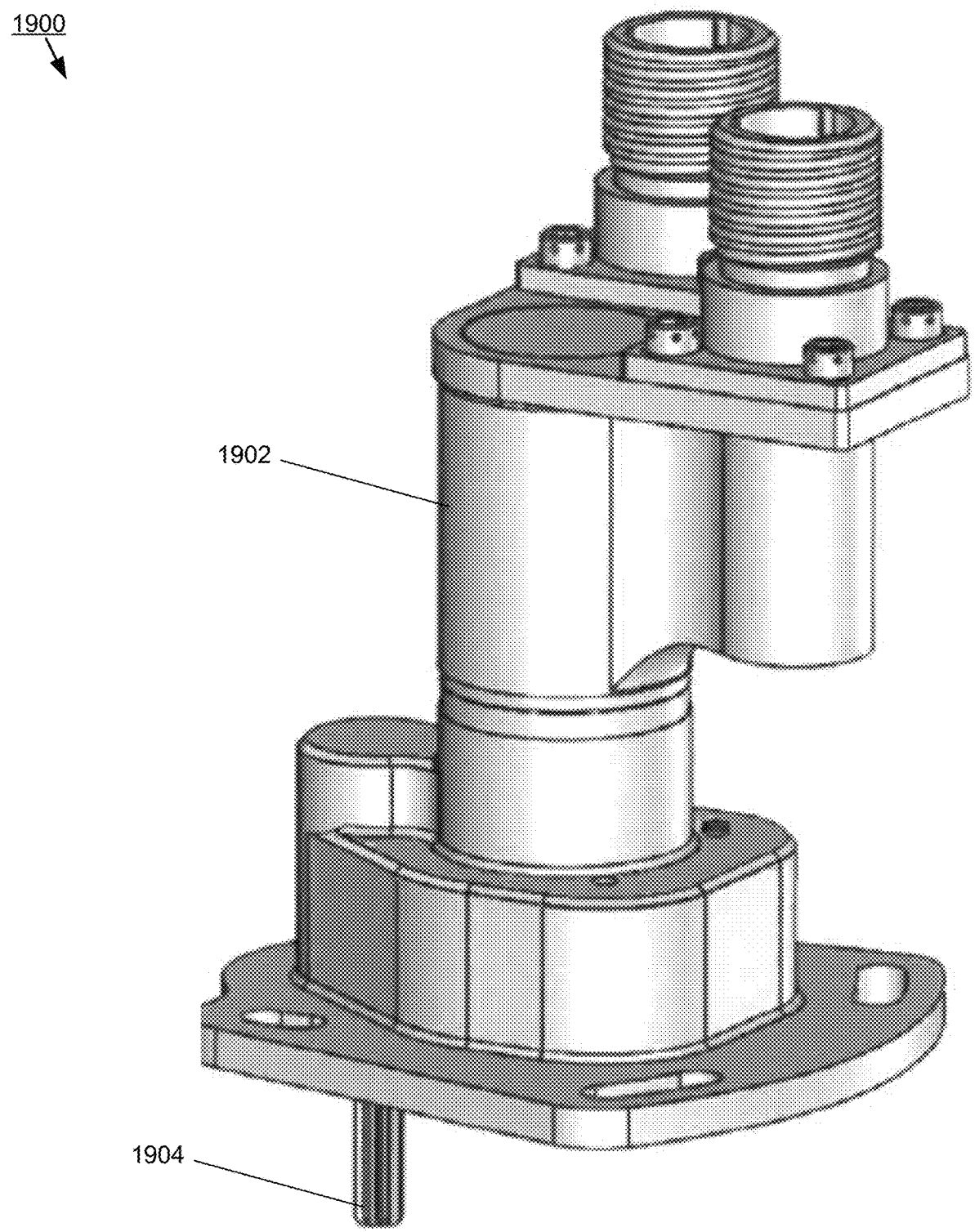

Referring now to FIGS. 18-19, an RVDT 1800 is provided. RVDT 1800 may include housing 1802 and an armature shaft included within housing 1802. Input shaft 1804 may extend from housing 1802 and be configured to mate with an airplane shaft. Input shaft 1804 may be independent from the armature shaft as is discussed below in further detail.

Figure 20:
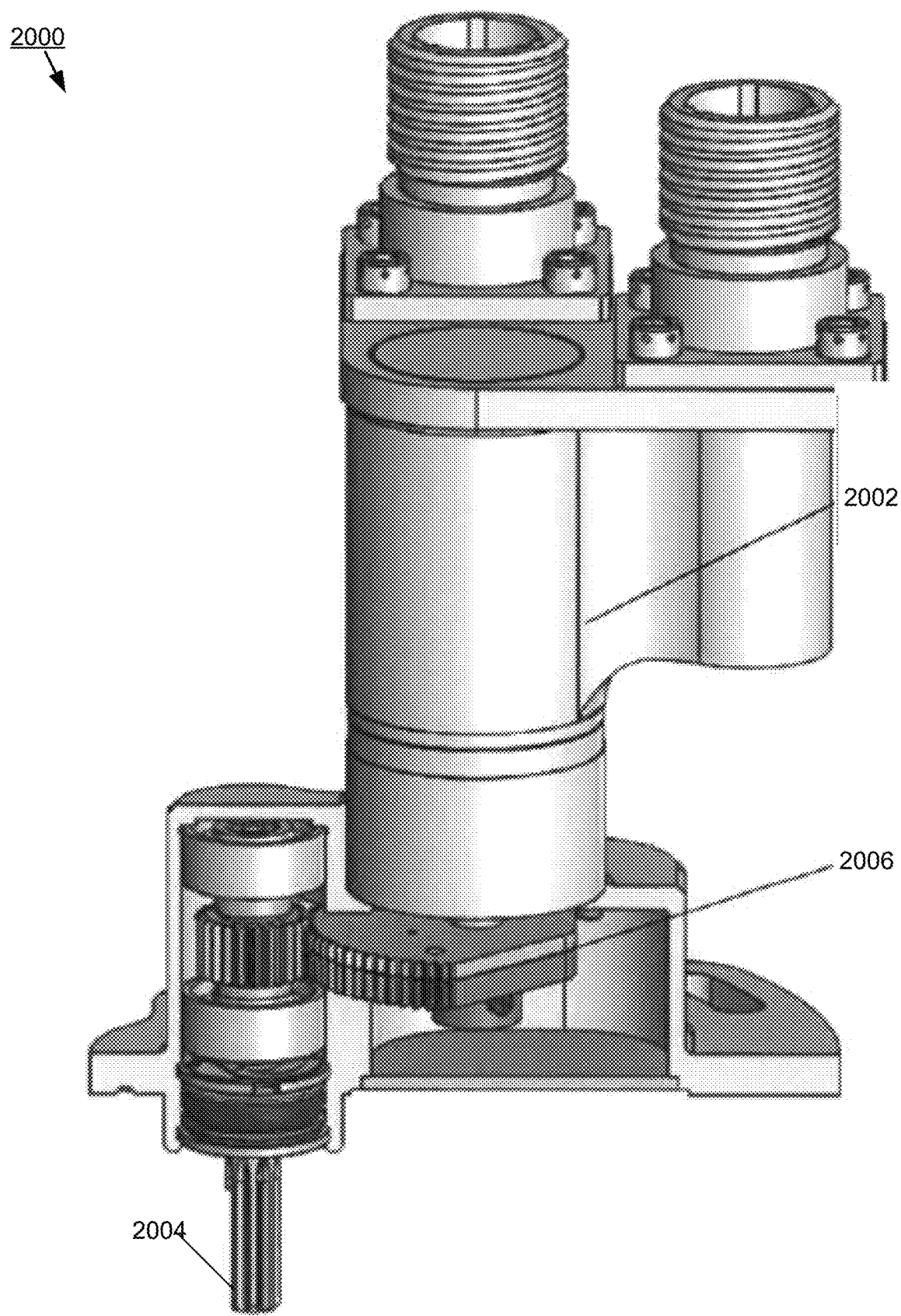

Referring also to FIG. 20, an embodiment showing an example RVDT 2000 is provided. RVDT 2000 includes housing 2002, input shaft 2004 and also includes a depiction of segmented anti-backlash gear 2006. Housing 2002 may include a slotted flange located at a base of the housing. In some embodiments, the slots on the flange may be used for installing the mounting bolts. The geometric shape of the slots may be configured to allow the rotation of the assembly around the shaft (as center of rotation) during installation of the device. The rotation of the assembly around the shaft may be important for adjusting the electrical null position of the RVDT during installation on aircraft. The geometric shape of the slots may include a kidney-shaped slot and the slots may include a slot angle. The shape and the angle of the kidney shape slot depends on the radial location of the slot from the center of the locator boss(shaft). In this embodiment, the slots on one side is the same angle whereas the slots on the other 2 have different angles. The further the slot is from the center of the boss, the more elongated the slot is. However, the specific angle of the slot angle may change based on the design.

Figure 21:
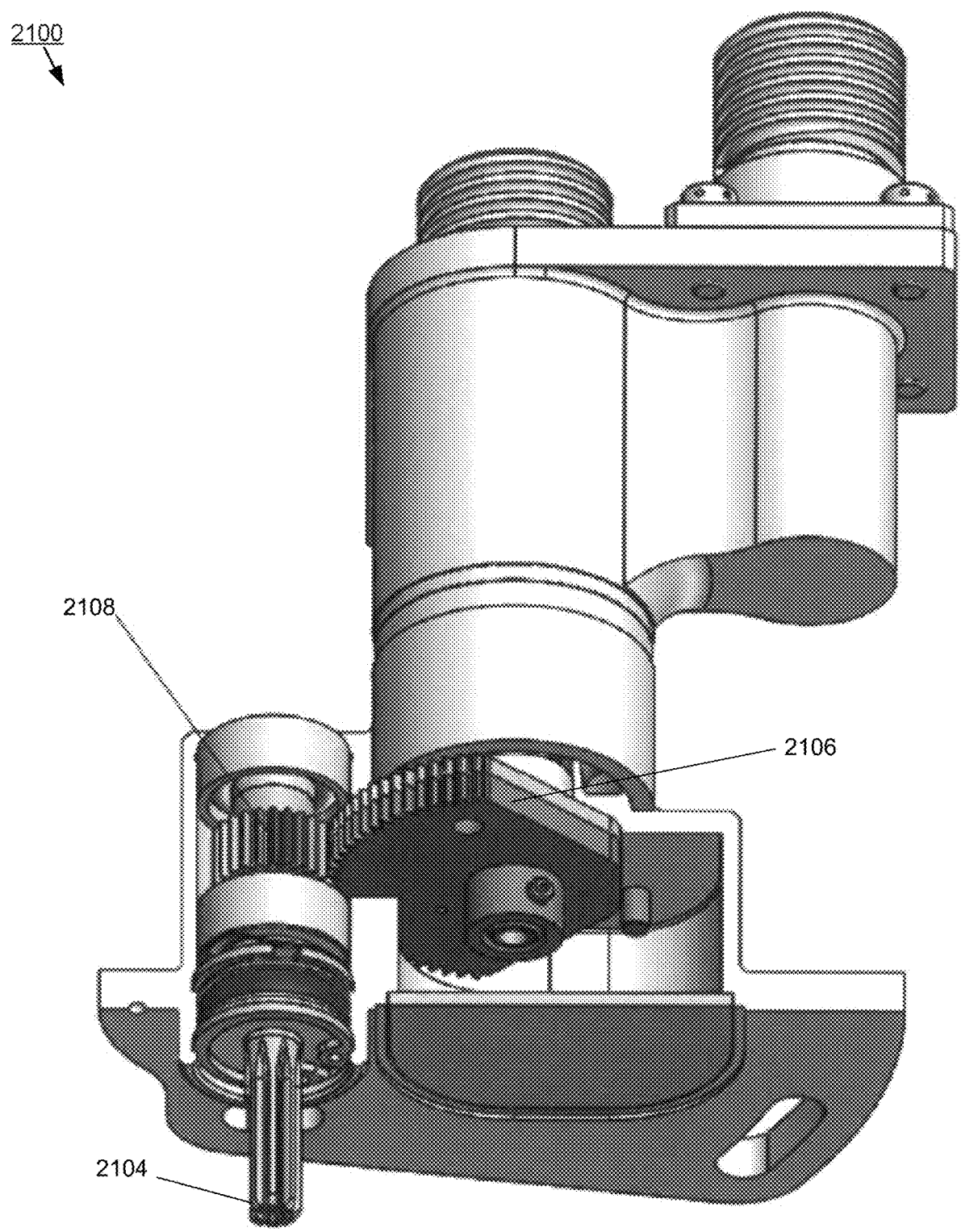

Referring also to FIG. 21, an embodiment showing an example RVDT 2100 is provided. RVDT 2100 includes a depiction of pinion gear shaft assembly 2108 configured to drive the segmented anti-backlash gear 2106. In operation, any rotation of the input shaft may be translated to the pinion gear shaft assembly as is discussed in further detail below.

Figure 22:
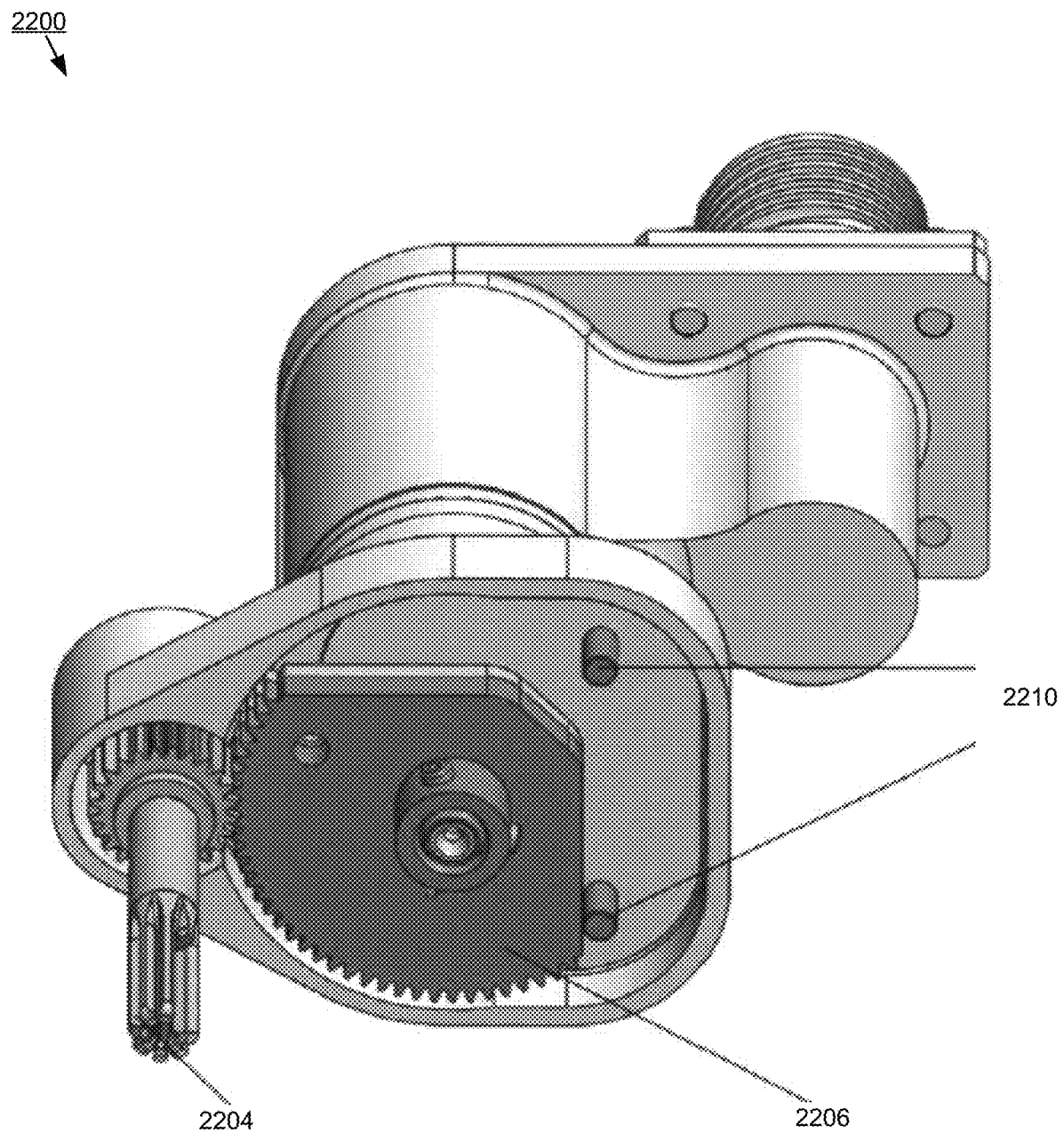

Referring also to FIG. 22, an embodiment showing an example RVDT 2200 is provided. RVDT 2200 includes a depiction of segmented anti-backlash gear 2206 as well as a plurality of stop pins 2210 configured to restrict movement of segmented anti-backlash gear 2206. In this particular embodiment, input shaft 2204 may include a flexible spline.

Figure 23:
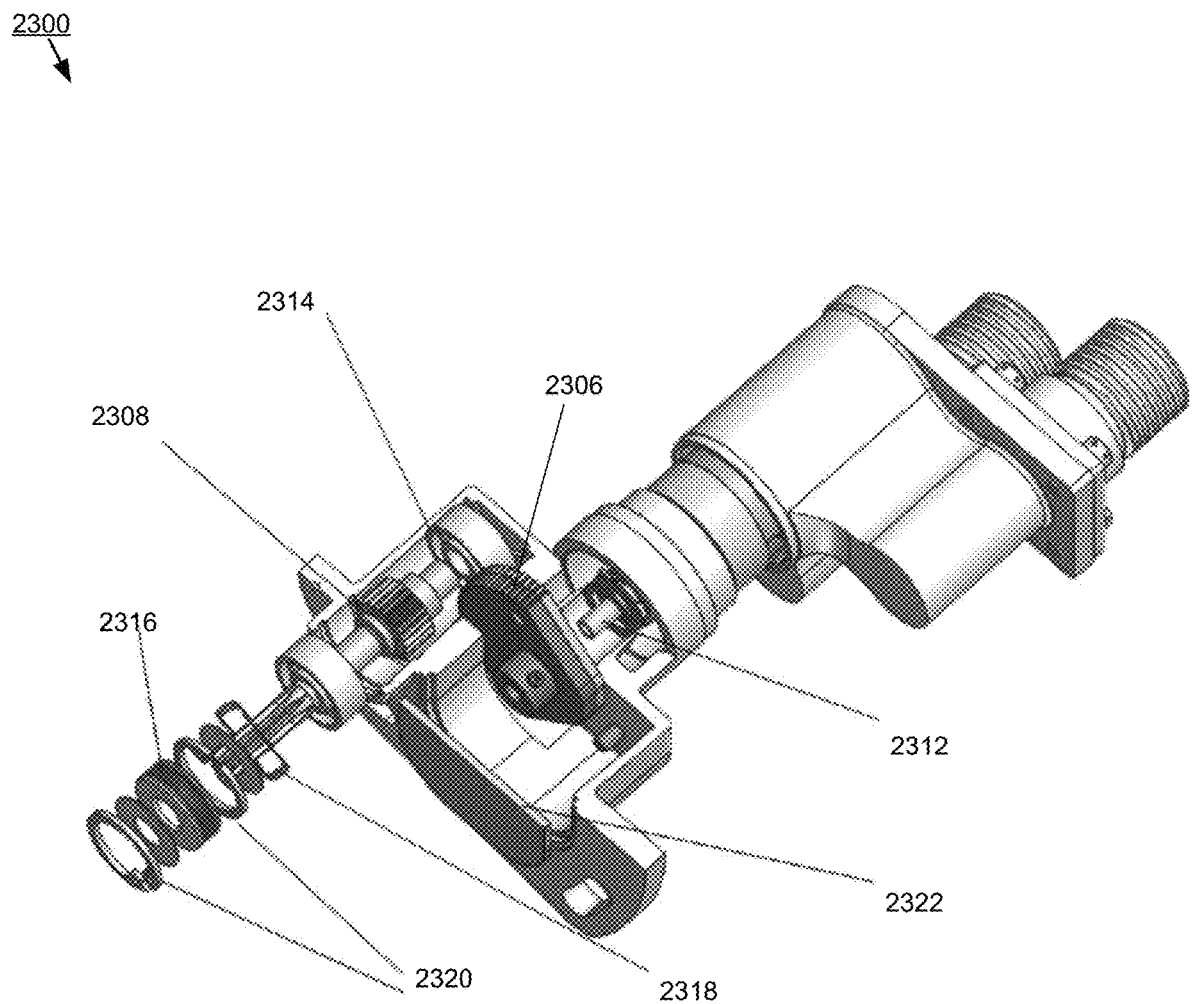

In some embodiments, segmented anti-backlash gear 2206 may be attached to the RVDT shaft (shown in FIG. 23 as 2312). Segmented anti-backlash gear 2206 may be configured to allow the diameter of the gear box to be smaller than if a conventional gear was included. The shape of segmented anti-backlash gear 2206 may be configured to allow only the number of teeth needed to be engaged to be available.

In some embodiments, plurality of stop pins 2210 may be included on each side of the segmented anti-backlash gear 2206. Plurality of stop pins 2210 may be configured to prevent segmented anti-backlash gear 2206 from disengaging with the pinion shaft. Plurality of stop pins 2210 may provide a mechanical feel during installation on aircraft.

Referring also to FIG. 23, an embodiment showing an example RVDT 2300 is provided. RVDT 2300 includes a depiction of segmented anti-backlash gear 2306, which may be in mechanical communication with armature shaft 2312. Pinion gear shaft assembly 2308 is shown substantially parallel to armature shaft 2312 but is independently located from armature shaft 2312. The input shaft of pinion gear shaft assembly 2308 may be in contact with plurality of ball bearings 2314. In operation, any rotation may be reduced by a gear ratio value and transferred to the armature shaft. A spring energized lip seal 2316 may be located on the input shaft proximate an end of the input shaft configured to mate with the airplane shaft.

In some embodiments, spring energized lip seal 2316 may be installed onto the input shaft. In some embodiments, the spring-energized lip seal may be installed on the input shaft above the bearing. Spring energized lip seal 2316 may be configured to prevent moisture intrusion into the gear box cavity and may be installed on the input shaft to seal the bearings inside the gear box cavity. Spring washers 2318 and retaining rings 2320 may also be employed proximate lip seal 2316. Welded cover 2322 is shown at the bottom portion of the slotted flange.

As shown in FIG. 23, the input shaft associated with assembly 2308, may be installed on plurality of ball bearings 2314, and may be totally independent of the main armature-shaft assembly 2312. In some embodiments, plurality of ball bearings 2314 may include precision bearings. As known in the industry, precision bearings may be rated by the Annular Bearing Engineering Committee (ABEC). Some embodiments of the RVDT may include one or more bearings rated, for example, but not limited to, ABEC 7 bearings. In some specific embodiments, the input shaft may be installed on two ABEC 7 bearings. In embodiments where the input shaft associated with assembly 2308 is independent from main armature-shaft assembly 2312, transverse side loading of in excess of 30 lbs to the end of the shaft may be allowed without affecting the accuracy of RVDT 2300. The use of the flexible spline also may allow for convenient, lash-free installation to the mating spline shaft on aircraft.

Figure 24:
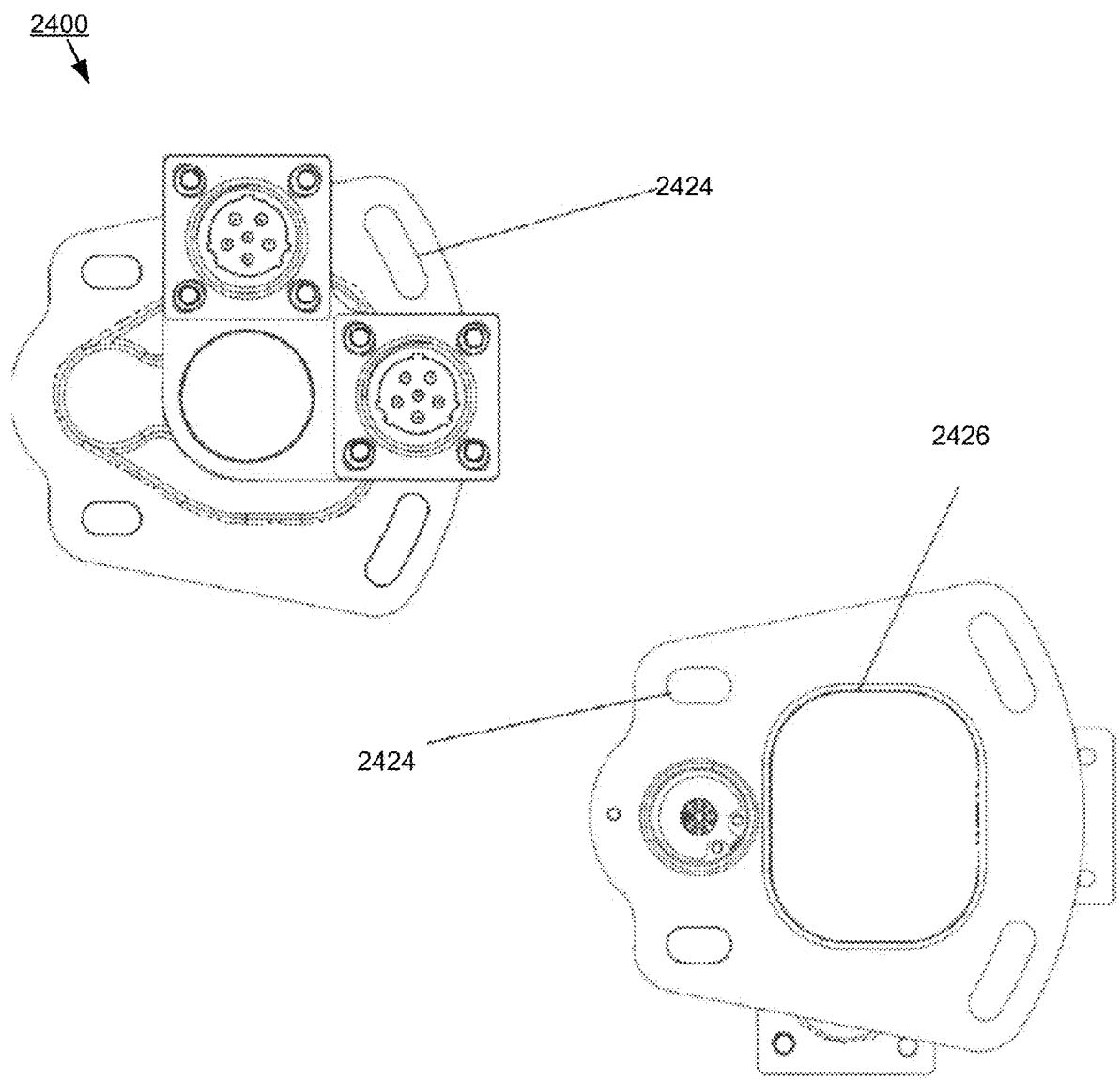

Referring also to FIG. 24, an embodiment showing an example RVDT 2400 is provided. RVDT 2400 includes a plurality of mounting slots 2424 and cover 2426. In some embodiments cover 2426 may be welded into a desired position.

Figure 25A:
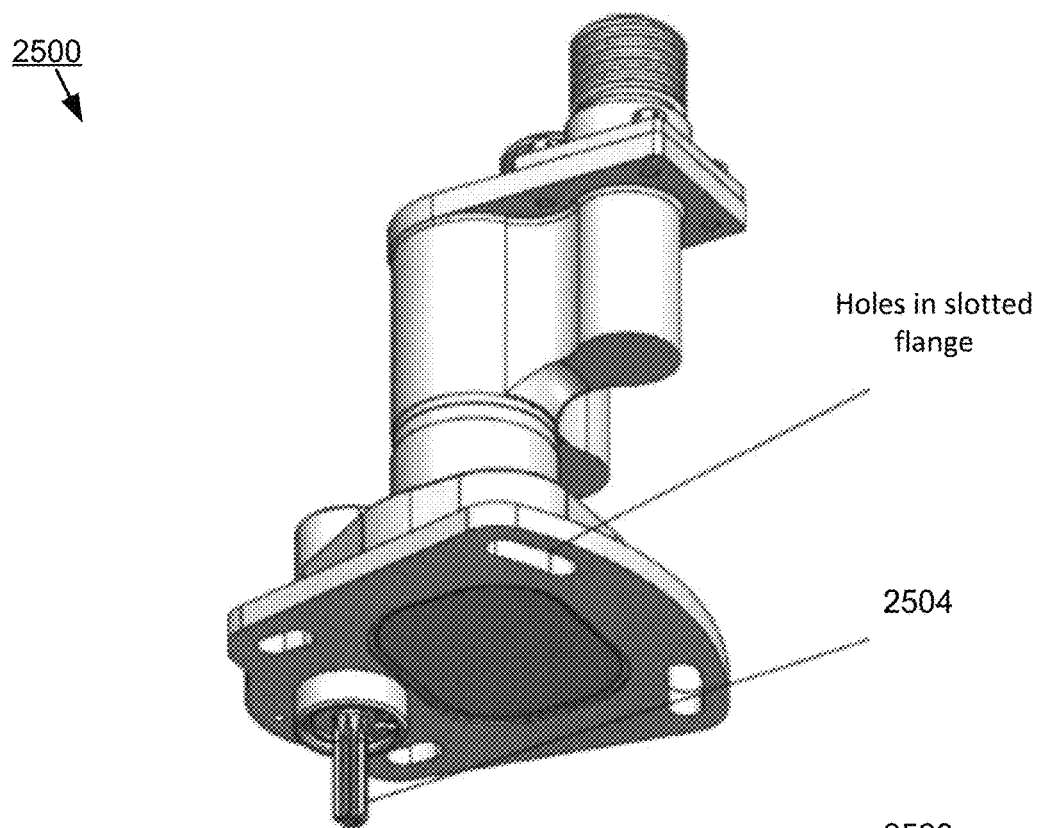
Figure 25B:
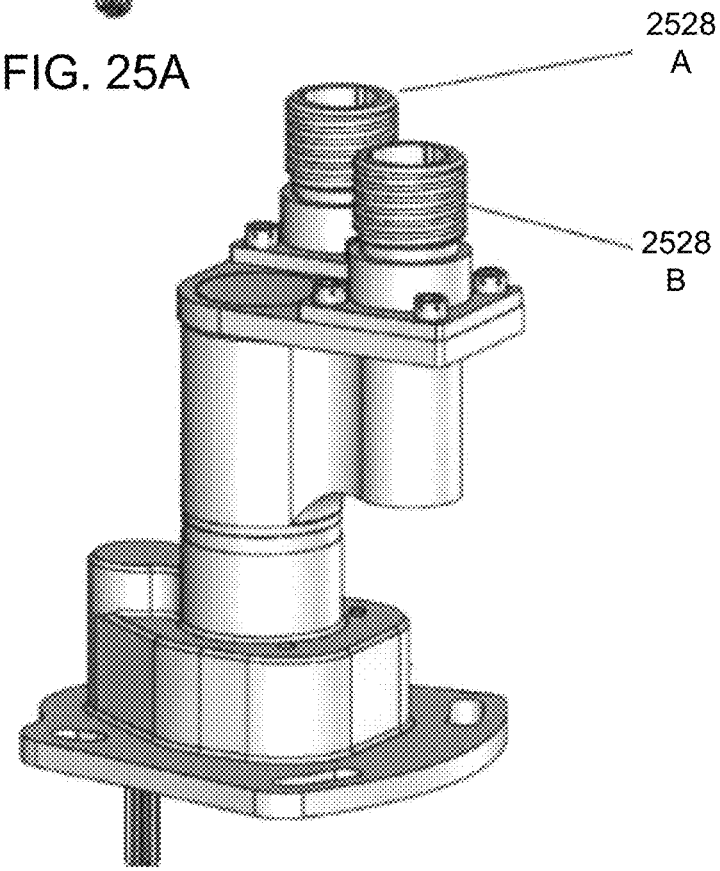

Referring also to FIGS. 25A-B, embodiments showing an example RVDT 2500 are provided. In FIG. 25A, RVDT 2500 includes slotted flange located at the base of the housing as described above. In operation, the slotted holes allow for mounting and null adjustment as necessary. In FIG. 25B, a plurality of connector channels 2528 are shown.

Figure 26:
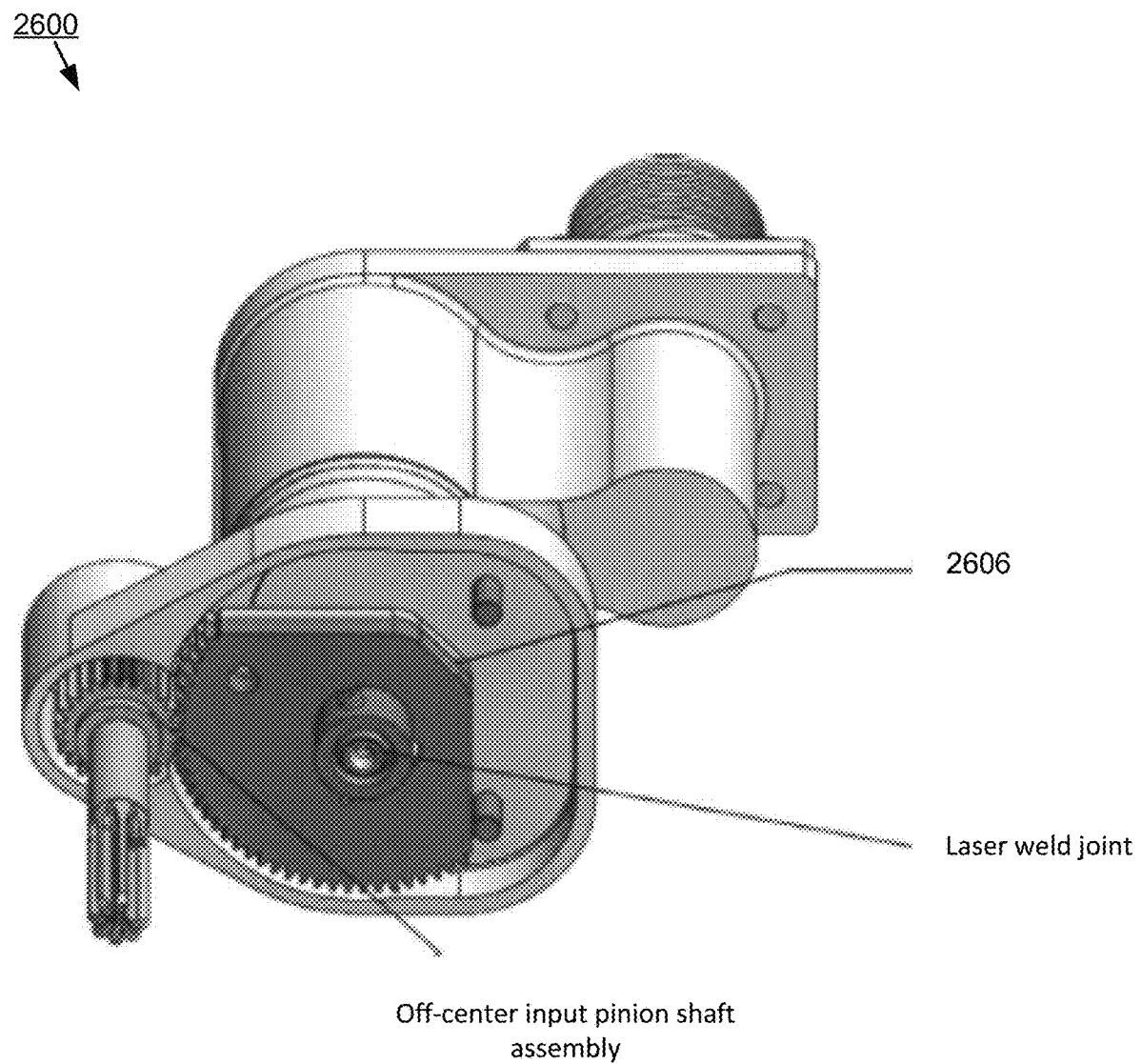

Referring also to FIG. 26, an embodiment showing an example RVDT 2600 is provided. RVDT 2600 includes segmented anti-backlash gear 2606 showing a laser weld joint. In this particular example, input pinion shaft assembly is shown arranged off-center.

Figure 27:
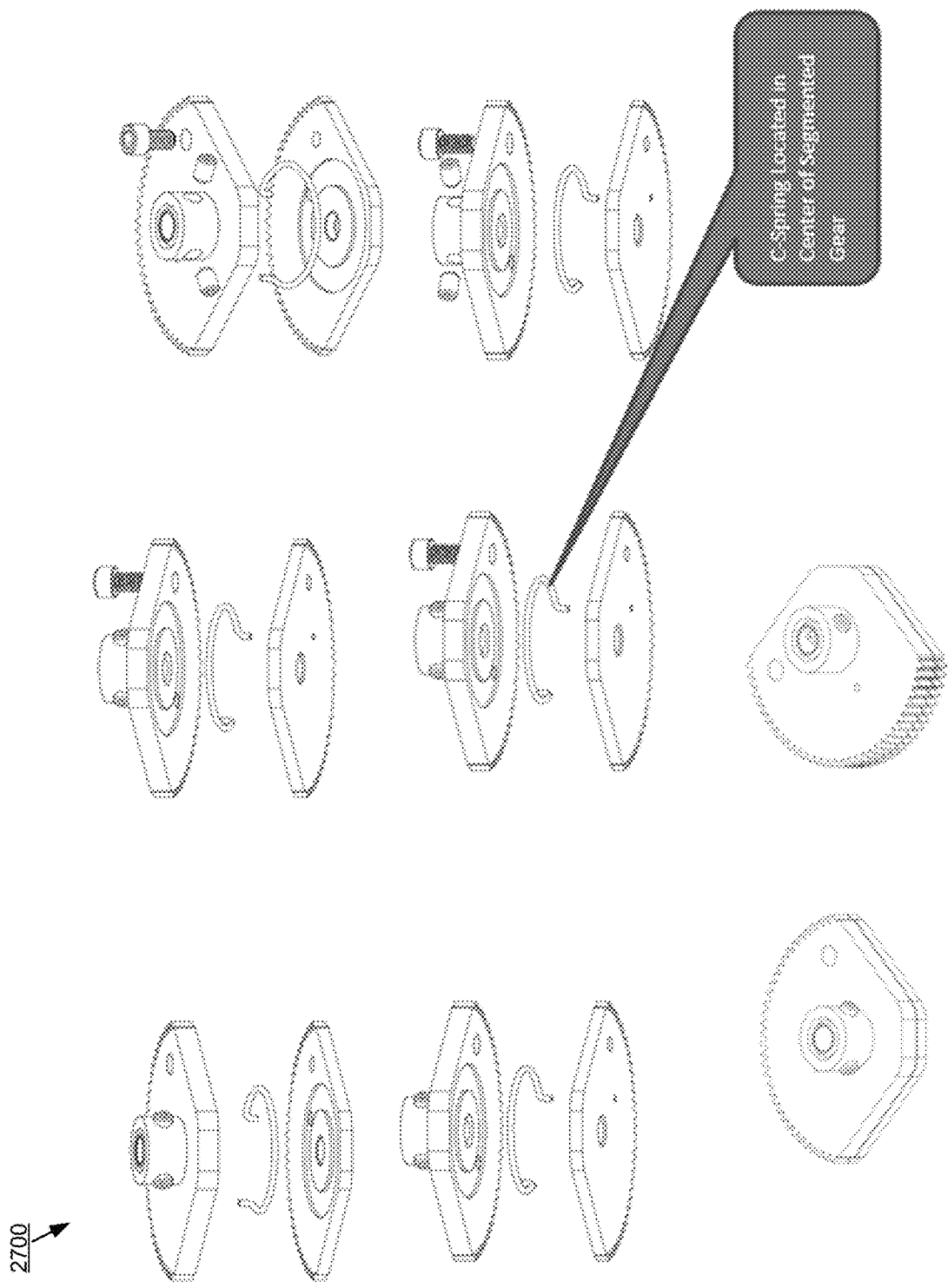
Figure 28:
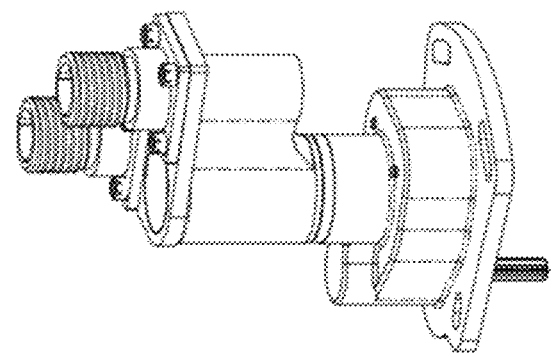
Figure 28:
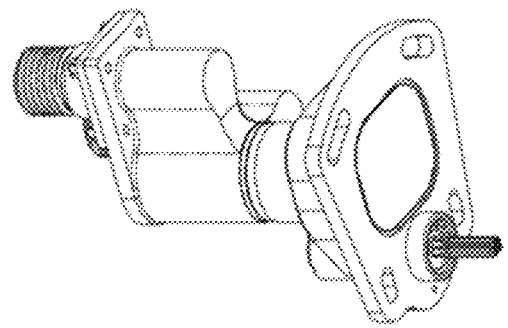
Figure 28:
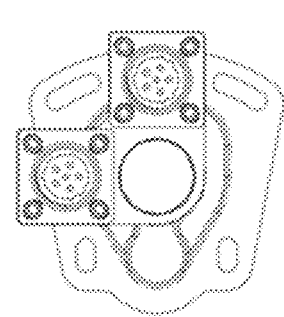
Figure 28:
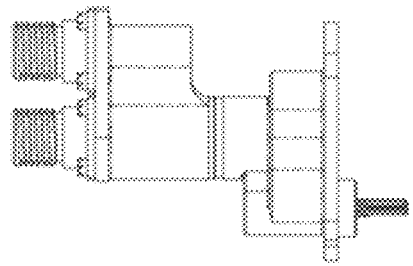
Figure 28:
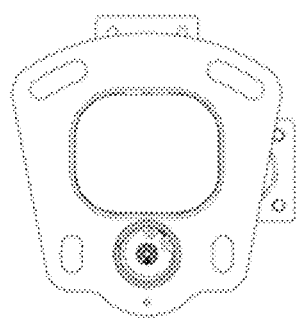
Figure 29:
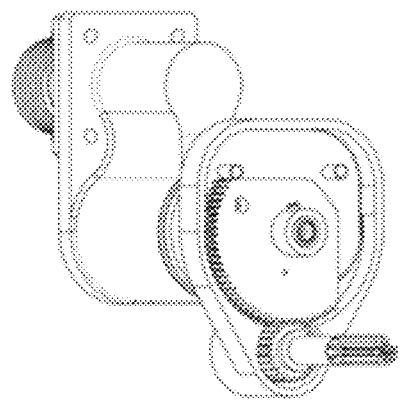
Figure 29:
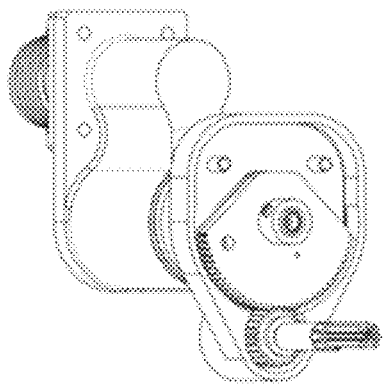
Figure 29:
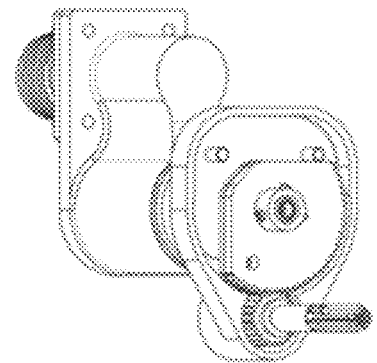
Figure 30:
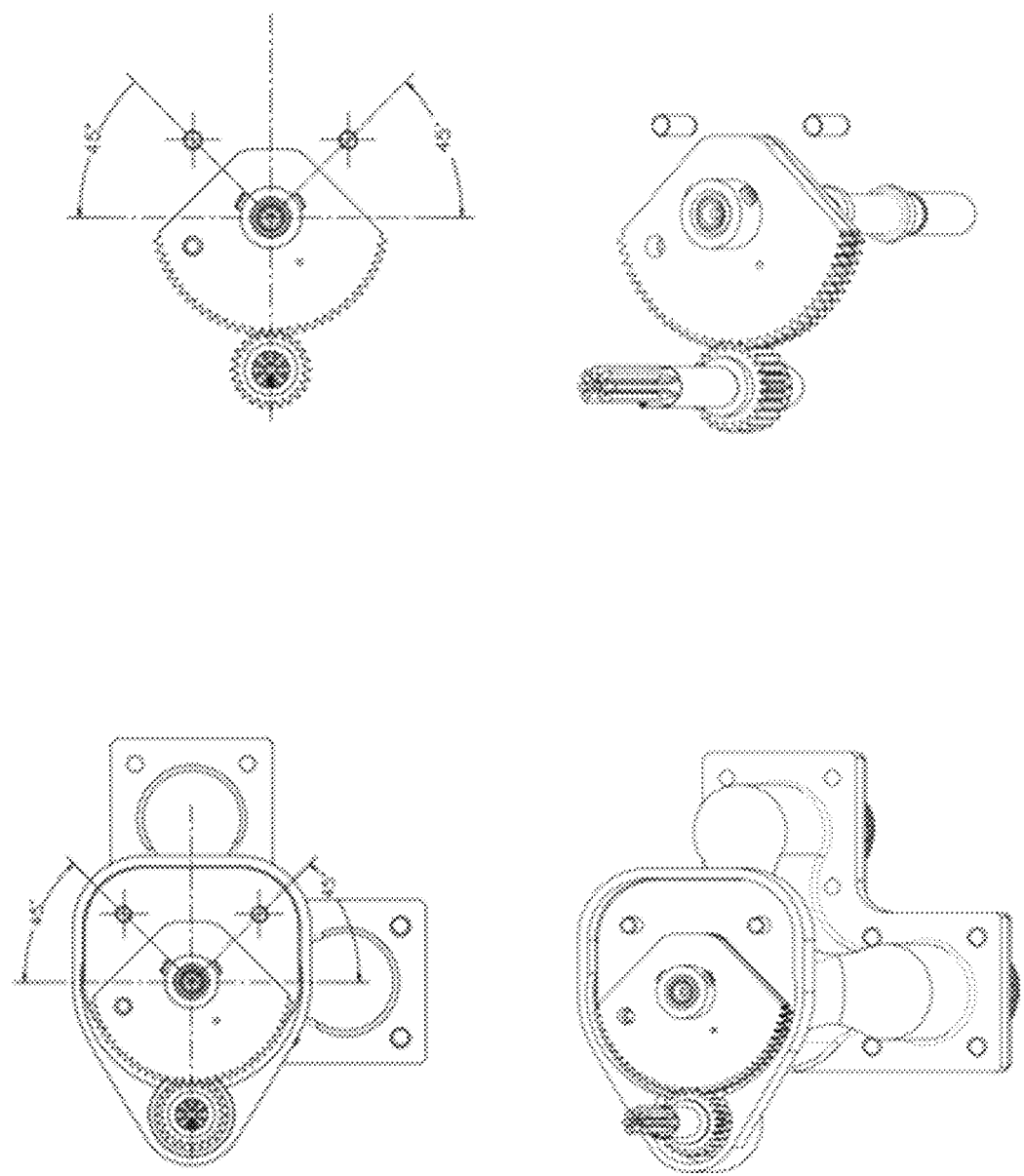
Figure 31:
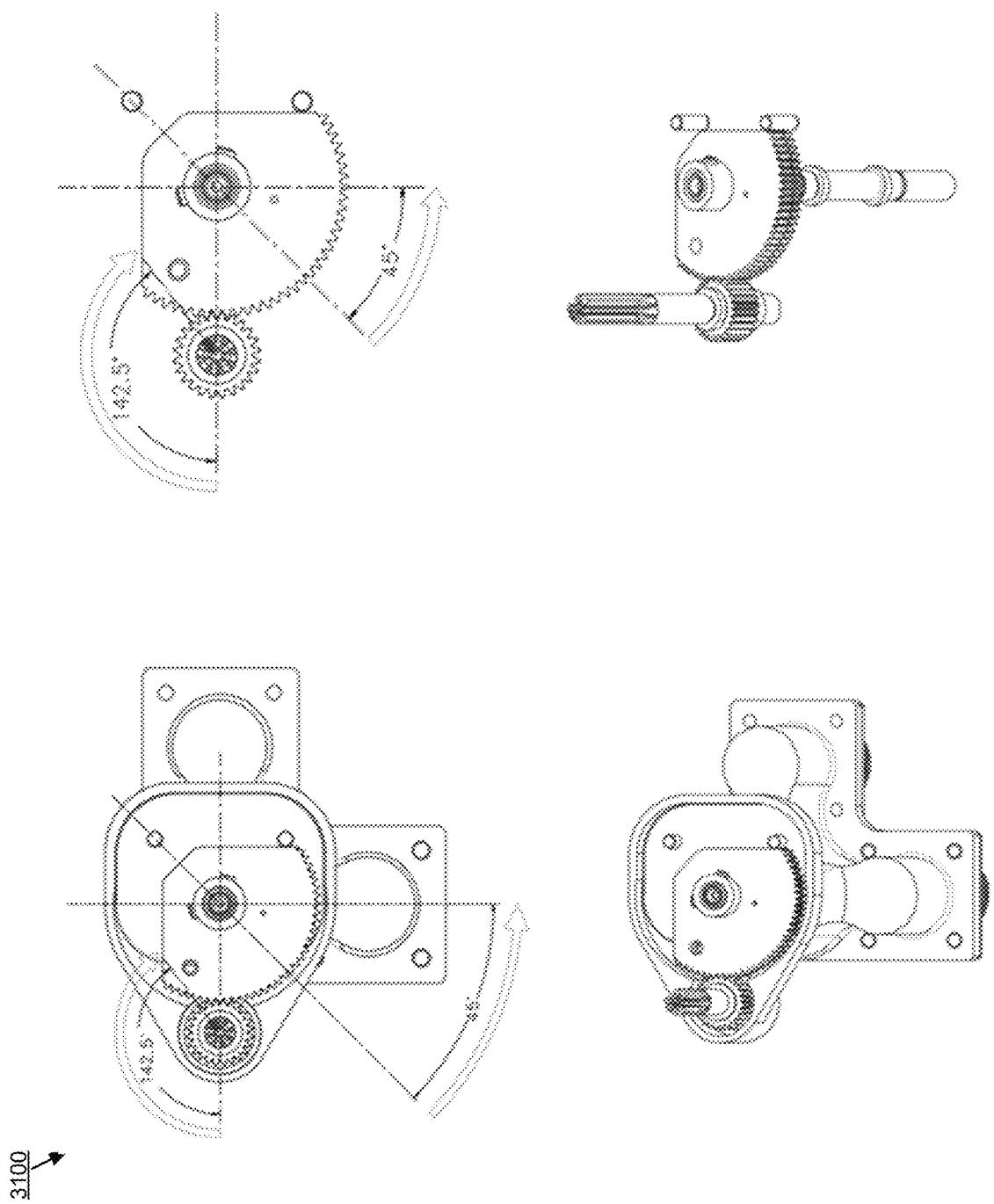
Figure 32:
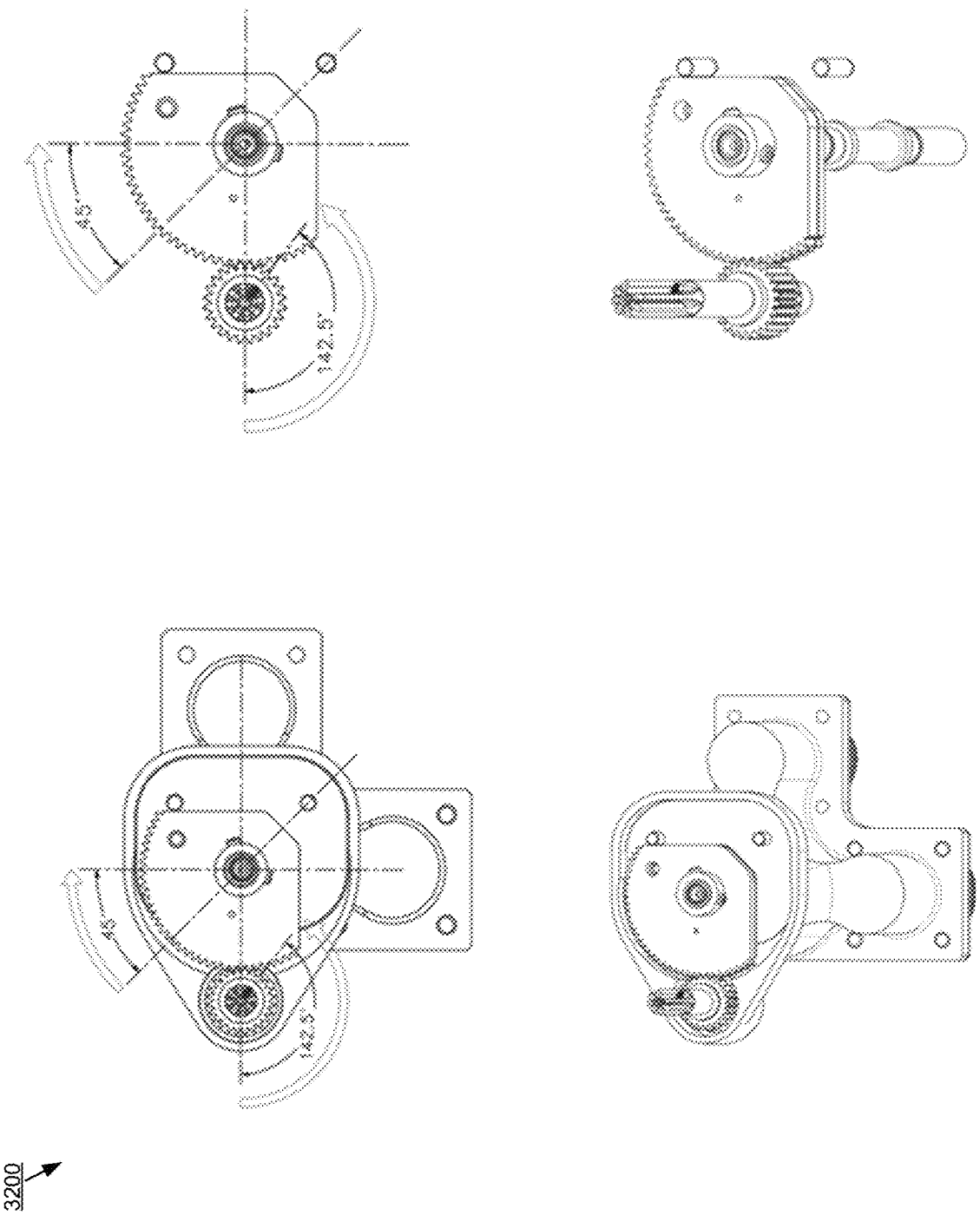
Figure 33:
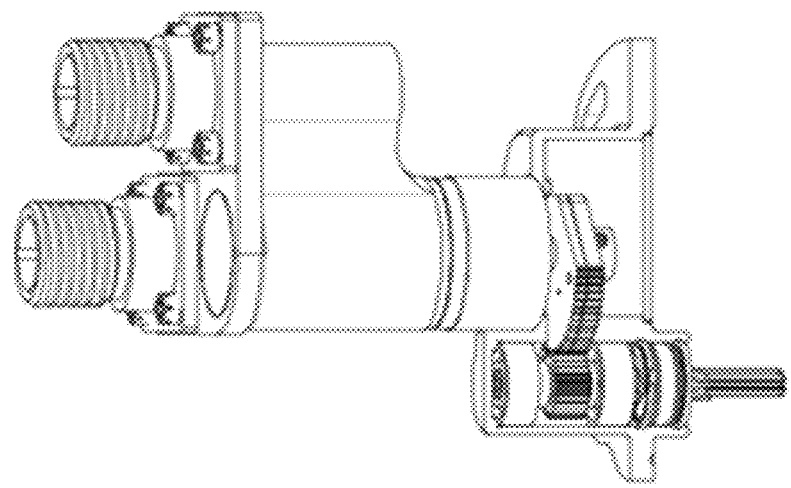
Figure 33:
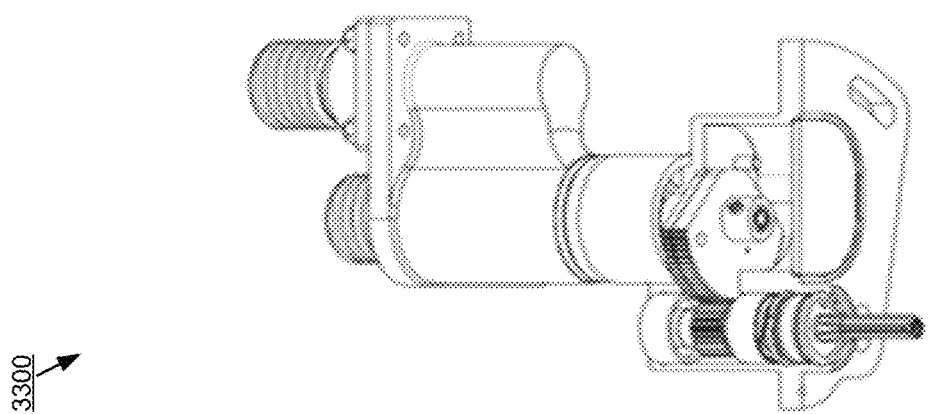
Figure 34:
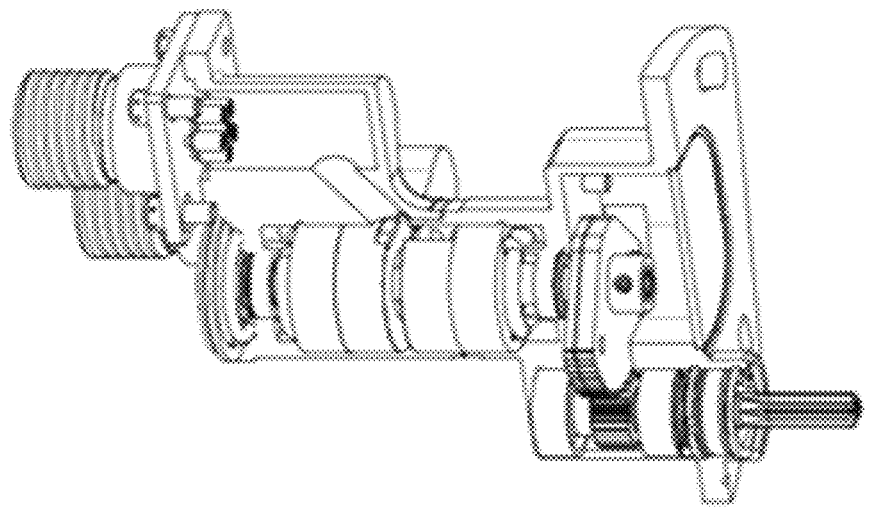
Figure 34:
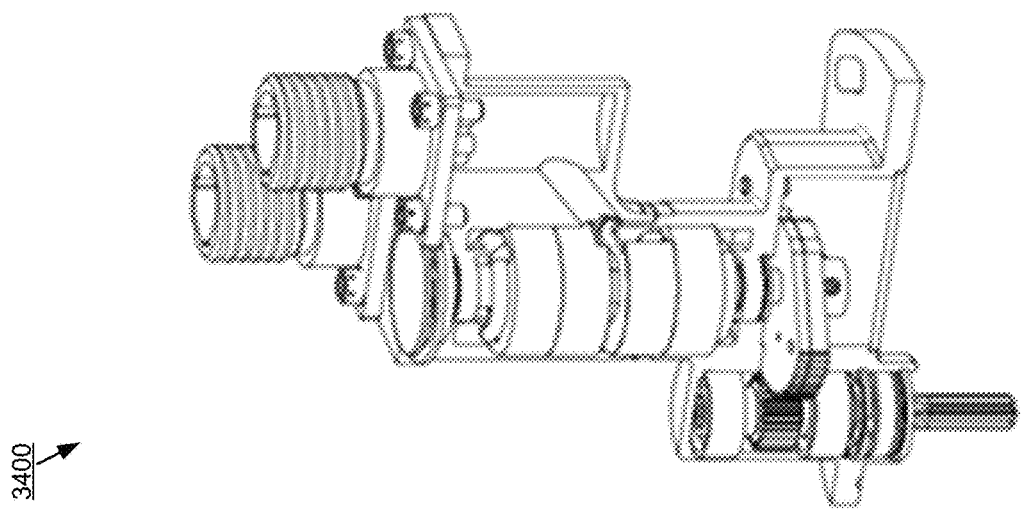
Figure 35:
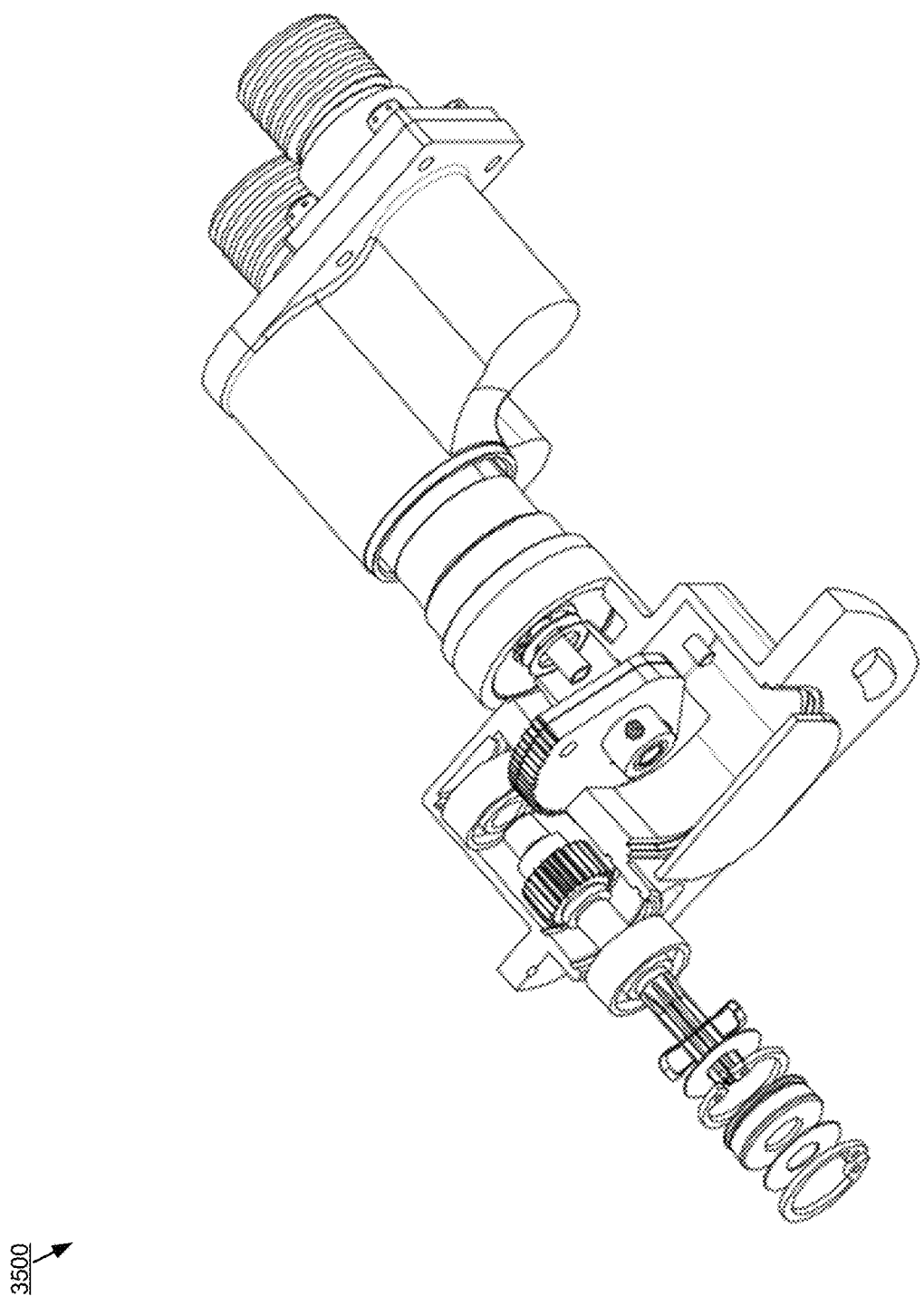

Additional embodiments of consistent with high accuracy, dual channel RVDT with a single-stage zero-backlash gear reducer assembly are provided in FIGS. 27-35. FIG. 27 depicts an exploded view of a segmented gear 2700 having a C-spring located in the center of the segmented gear. FIGS. 28-35 depicts additional examples of RVDTs 2800-3500 consistent with embodiments of the present disclosure.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A rotary variable differential transducer comprising:
   a housing;
   an armature shaft included within the housing;
   an input shaft configured to mate with an airplane shaft, wherein the input shaft is independent from the armature shaft;
   a segmented anti-backlash gear attached to the armature shaft;
   a pinion gear shaft assembly configured to drive the segmented anti-backlash gear thereby creating a single stage gear reducer assembly; and
   a plurality of stop pins included on each side of the segmented anti-backlash gear, wherein the plurality of stop pins configured to prevent the segmented anti-backlash gear from disengaging with the pinion gear shaft.

2. The rotary variable differential transducer of claim 1, wherein at least one end of the input shaft includes a flexible spline.

3. The rotary variable differential transducer of claim 1, wherein the input shaft is in contact with a plurality of ball bearings.

4. The rotary variable differential transducer of claim 1, further comprising:
   a spring energized lip seal located on the input shaft proximate an end of the input shaft configured to mate with the airplane shaft.

5. The rotary variable differential transducer of claim 1, further comprising:
   at least one stop pin of the plurality of stop pins configured to restrict movement of the segmented anti-backlash gear.

6. The rotary variable differential transducer of claim 1, wherein the housing includes a slotted flange located at a base of the housing.

7. The rotary variable differential transducer of claim 1, wherein any rotation of the input shaft is translated to the pinion gear shaft assembly.

8. The rotary variable differential transducer of claim 7, wherein the rotation is reduced by a gear ratio value and transferred to the armature shaft.

* * * * *